United States Patent [19]

Pasierb, Jr.

[11] Patent Number: 4,597,043

[45] Date of Patent: Jun. 24, 1986

[54] HIGH SPEED CPU/SEQUENCER FOR VIDEO GAMES

[75] Inventor: John J. Pasierb, Jr., Schaumburg, Ill.

[73] Assignee: Bally Manufacturing Corporation, Chicago, Ill.

[21] Appl. No.: 388,907

[22] Filed: Jun. 16, 1982

[51] Int. Cl.[4] ............................ G06F 9/22; G06F 1/04
[52] U.S. Cl. .................................... 364/200; 340/789;
364/410; 273/85 R
[58] Field of Search ............... 364/200, 900, 705, 410,
364/521; 273/85 R, 85 G, DIG. 28; 340/703,
723, 747, 789, 725

[56] References Cited

U.S. PATENT DOCUMENTS

| | | | |
|---|---|---|---|
| 3,603,964 | 9/1971 | Harrison, III | 340/725 |
| 4,027,148 | 5/1977 | Rosenthal | 340/324 A X |
| 4,053,740 | 10/1977 | Rosenthal | 364/410 X |
| 4,085,442 | 4/1978 | Liaukus | 364/900 |
| 4,104,624 | 8/1978 | Hamada | 340/825.27 X |
| 4,165,072 | 8/1979 | Stubben | 364/410 X |
| 4,169,262 | 9/1979 | Schwartz et al. | 273/DIG. 28 X |
| 4,172,281 | 10/1979 | Gordon | 364/200 |
| 4,177,462 | 12/1979 | Chung | 340/703 |
| 4,237,543 | 12/1980 | Nishio et al. | 364/900 |
| 4,342,095 | 7/1982 | Goodman | 364/900 |
| 4,398,189 | 8/1983 | Pasierb, Jr. et al. | 273/DIG. 28 X |

OTHER PUBLICATIONS

Giloi, W., *Interactive Computer Graphics*, Englewood Cliffs, N.J., Prentice-Hall, 1978, pp. 249-256.
Chapin, N., *360/370 Programming in Assembly Language*, N.Y., McGraw-Hill, 1973, p. 15.
Newman, W. M. and Sproull, R. F., *Principles of Interactive Computer Graphics*, N.Y., McGraw-Hill, 1979, Ch. 26.

*Primary Examiner*—James D. Thomas
*Assistant Examiner*—William G. Niessen
*Attorney, Agent, or Firm*—Jenner & Block

[57] ABSTRACT

A high speed CPU/sequencer for use in a video game provides multi-channel binary output for display control purposes. The CPU/sequencer includes a macro-section that is user programmable with macro-instructions and a micro-section that is user programmable with micro-instructions. The CPU/sequencer is responsive to display information provided by a game microprocessor during a brief handshake period and carries out display computations independently of the game microprocessor, at higher speed, and using larger binary data words.

8 Claims, 19 Drawing Figures

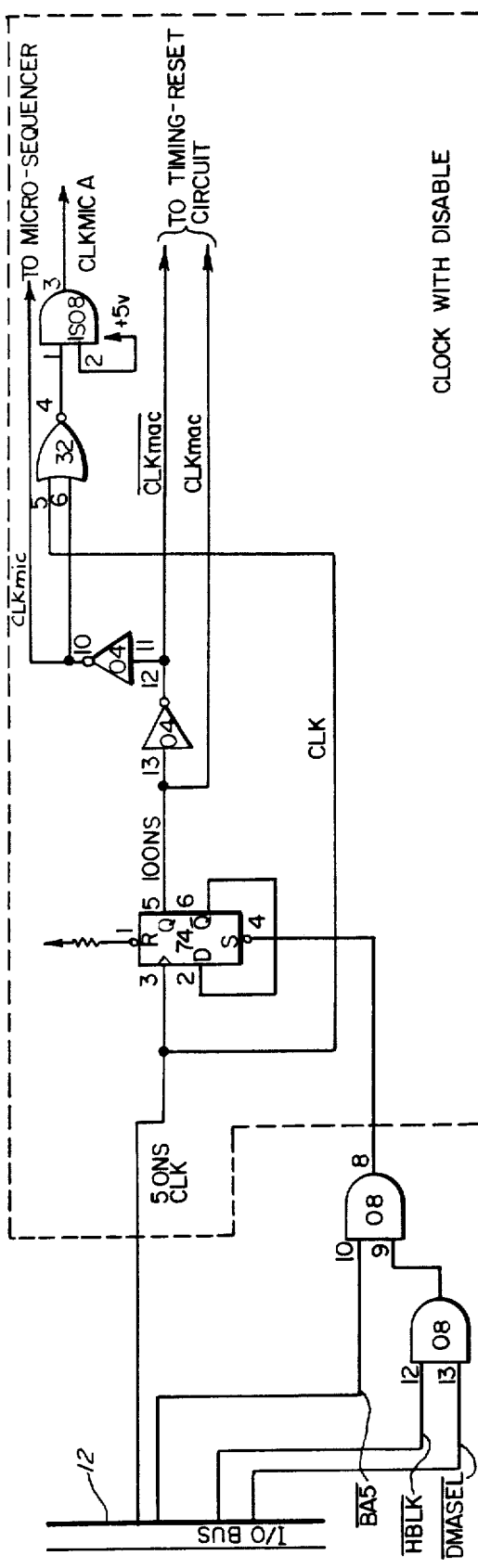
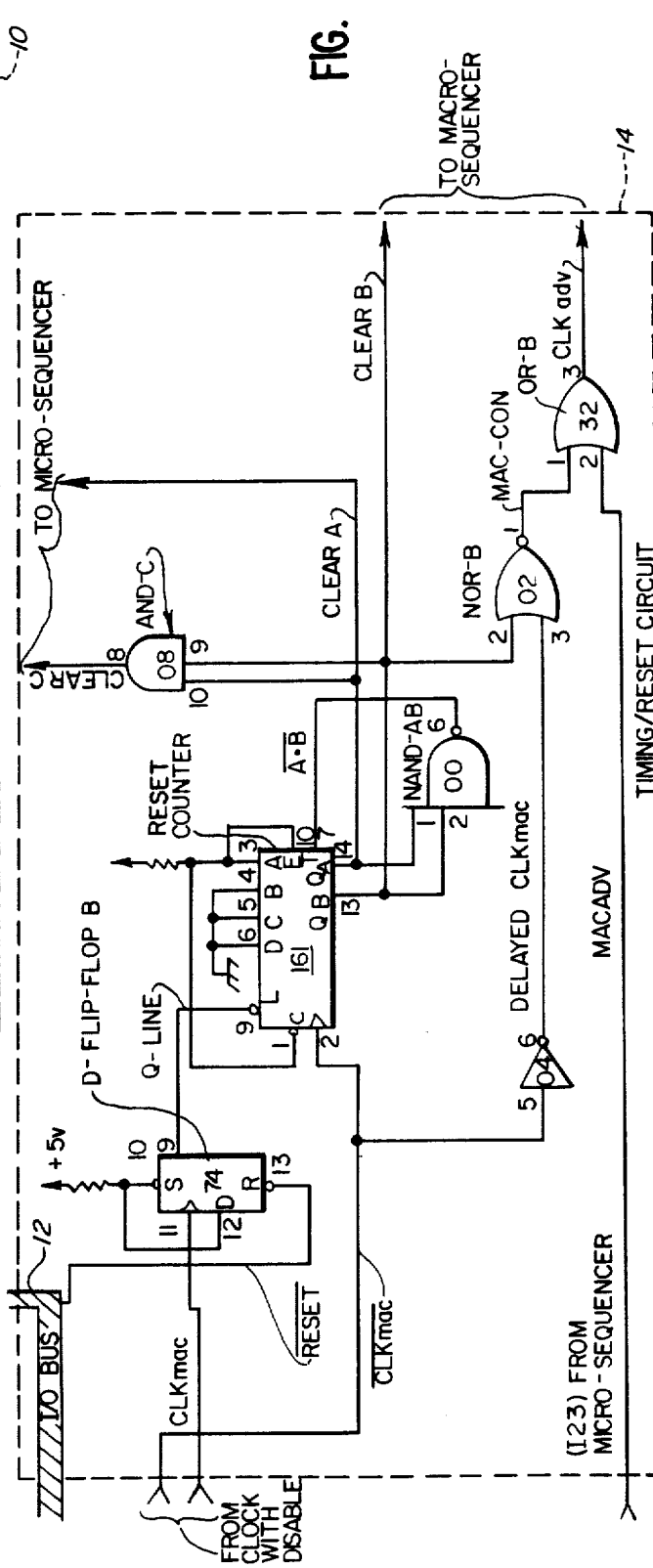
FIG. 2
FIG. 3

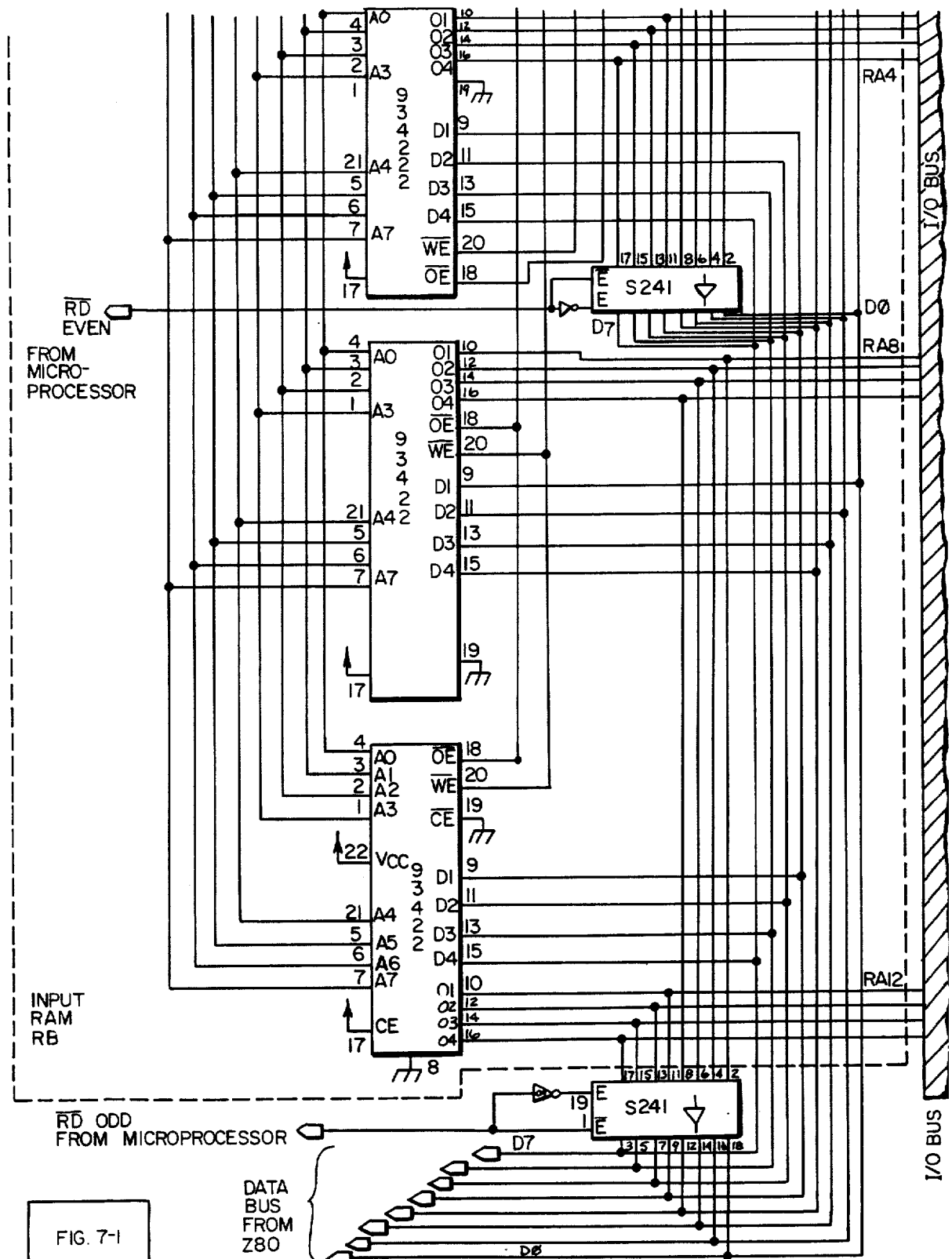

4,597,043

HIGH SPEED CPU/SEQUENCER FOR VIDEO GAMES

BACKGROUND OF THE INVENTION

This invention pertains to the display of a multiplicity of moving objects on a raster scan display during the play of an electronic video game. More particularly, this invention relates to circuitry for inexpensively producing signals for controlling the display of a large number of objects on a color TV monitor in a game controlled, for example, by a microprocessor. Even more particularly, this invention relates to flexible, user-programmable circuitry for performing high speed logical and arithmetic operations related to such displays. A companion application by the same inventor, entitled "General Purpose Display Circuitry for Video Games", has been been concurrently executed and filed.

The approach taken earlier in microprocessor-based video game displays has been to create a memory map or "bit map" by writing into a memory information defining an entire frame to be displayed, as discussed in Giloi, W. *Interactive Computer Graphics*, Englewood Cliffs, N.J., Prentice-Hall, 1978, pp. 249–256 and in U.S. Pat. No. 4,177,462 issued to Chung. Chung attempts to liberate the game microprocessor from the arduous and very time-consuming task of preparing a memory map. He is thereby able to achieve a substantially improved capability for displaying and moving substantial numbers of objects on a screen by the use of dedicated game display circuitry. Chung's proposal does, however, continue to impose severe constraints upon the game microprocessor. Chung permits game control information to be placed in a permanent memory associated with the game display circuitry, thereby requiring extensive communication between the game microprocessor and the display circuitry. Furthermore, he requires that both the game microprocessor and the display circuitry operate synchronously off a single clock. The game microprocessor must become inactive during all communication periods and therefore time is taken or "stolen" from the game microprocessor's available time for performing game-associated computations. Finally, Chung's proposal requires the use of content addressable memories which are highly specialized, and therefore expensive, devices.

Chung's proposal makes use of specialized display circuitry. High speed general purpose computers have also been used with peripheral graphic display systems for visual simulations, as discussed in U.S. Pat. No. 4,053,740. Specialized display circuitry suffers the disadvantage of the inherent inflexibility of hard-wired systems. High speed general purpose computers are inherently flexible, but are far too costly, bulky and complicated for use in arcade or home games.

Programmable general purpose microprocessors offer flexibility and reliability, thereby suggesting that a dedicated microprocessor would be desirable for performing display functions in a video game. Available general purpose microprocessors do not, however, have the speed and parallel bit capacity to handle high resolution displays. Presently available 8-bit microprocessors can output data at a maximum bit rate of about 7.5 MHz per channel. Microprocessors with larger parallel bit capacity are slower.

General purpose microprocessors also have fixed microprograms for operating associated logic gates. The user of such a microprocessor will write programs consisting of permissible macro-instructions. Each permissible macro-instruction will activate a sequence of several micro-instructions comprising one of the fixed microprograms. The user cannot, however, change the microprograms to optimize a microprocessor for the particular use to which it is to be put.

Existing microprocessors are consequently insufficiently fast and flexible, and have insufficient parallel bit capacity, for controlling high resolution video game display functions.

The present invention is accordingly directed to circuitry for a high speed processor means for generating video display signals in response to video display data provided by the game microprocessor. The microprocessor data may be quite general in nature so that it may be transmitted to the high speed processor during a brief "handshake" period prior to each picture of a raster scan display.

The circuitry may be of very general application. The generality results in part from the limited need for communication between the game controller, e.g., the aforementioned microprocessor, and the high speed processor means. The display circuitry thereby operates substantially independently of the game details.

For example, in the concurrently filed application by the same inventor (identified above and incorporated herein as though quoted in full), the only game specific portion of the display circuitry is contained in the permanent memory which contains the representations of the objects that are to be displayed. The game microprocessor, consequently, need only supply during vertical blanking the identities of the objects to be displayed and coordinates defining the display positions and widths of the objects to be displayed. Further independence is achieved by providing different means for clocking the microprocessor and the display circuitry, although it is entirely feasible to run both off a single basic clock.

SUMMARY OF THE INVENTION

A specific construction embodying principles taught by the invention operates as a component of an embodiment of the General Purpose Display Circuitry for Video Games described in the aforementioned concurrently filed application. As described therein, the display circuitry provides means for timing and control of the sweep, color, intensity, and blanking on a raster scan display monitor. A single display on the monitor may comprise 480 horizontal lines in the described construction. Each horizontal line is divided for control purposes into 512 discrete adjacent parts, known as pixels. The division into pixels is only conceptual; horizontal line scanning by the monitor ordinarily results in an essentially continuous line.

A single display includes two interlaced frames, each comprising a vertical sweep of the monitor face. The first frame displays the even numbered lines, 0–476 and the first one-half of line 478. The second frame displays the second half of line 1 and the remaining odd numbered lines through line 479. Each frame occurs in a time lapse of 15.2 ms., followed by a 1 ms. blanking period, which will be referred to as VBLK. The raster thereby presents approximately 30 displays per second. Higher resolution displays, having more vertical lines and more pixels per line are also envisioned by the present invention.

Each horizontal line is swept in a horizontal sweep time of about 51.2 microsec., followed by an approximately 12.2 microsec. blanking period, which will be referred to as HBLK.

The display circuitry, in the specific construction, controls three color gun amplifiers and an intensity amplifier which, in turn, control the monitor display. The display circuitry also provides a clock, vertical and horizontal counters, and sweep and blank signals for the display monitor. The clock provides an approximately 50 ns. square wave.

Objects to be displayed during the play of a game are coded into an object ROM in the display circuitry. The objects coded into the ROM are not associated with any particular screen positions. It is a function of the display circuitry in cooperation with the CPU/sequencer of the present invention to place particular objects at particular screen locations for each display on the monitor face. The game microprocessor provides data signals comprising the ROM addresses of objects to be displayed, initial display positions of each object, and the width and height of each object. The data signals are stored in an input RAM RB which is accessible to both the game microprocessor and the CPU/sequencer. The data signals are transmitted from the game microprocessor during the VBLK period preceding each display. The CPU/sequencer is thereby provided with the screen location of each object to be displayed during each display on the monitor face. The CPU/sequencer functions as a second microprocessor means dedicated to display functions. It processes the data signals in order to provide video display signals to the display circuitry. The sequencer comprises high speed circuitry enabling the control of a large number of objects on a high resolution screen. As an associated feature, the sequencer outputs simultaneous control signals on a large number of channels at a high data rate, 27 channels at about 20 MHz in a specific construction described herein.

The CPU/sequencer in the specific construction described herein comprises a logic means, a macro-section including a ROM coded with macro-instructions, and a microsection including a ROM coded with micro-instructions. The micro-instructions are executed at the 20 MHz clock rate, each said micro-instruction controlling the state of 27 binary data channels. Each macro-instruction causes the execution of a sequence of micro-instructions. The macro-instructions are executed in sequences dependent upon the data signals provided to the CPU/sequencer.

The macro- and micro- instructions may be adapted to the particular display circuitry incorporating the CPU/sequencer of the present invention. The instructions are, in that sense, user programmable.

The teachings of the invention may, consequently, be embodied in a CPU/sequencer which is provided with a beginning line number and beginning horizontal pixel number for each object to be displayed in the course of a single display. In a specific construction the CPU/sequencer determines at the beginning of each horizontal line displayed by the display circuit whether the line lies within the vertical line range of any currently displayed objects. For each such object the display circuitry needs only the starting horizontal pixel address on the current line. Immediately after a counter counts to the value of the address the display circuitry, synchronously with display of the line on the monitor, sequentially latches four 32-bit data groupings out of the object ROM on every eighth count of the horizontal pixel counter. Each grouping then provides 4 bits of color/intensity information for each of the next eight pixels.

Use of the CPU/sequencer in the embodiment obviates the need to provide a map of an entire display between displays. The CPU/sequencer causes an A-control section of the display circuit to load a RAM RC and a RAM RD in the display circuit during each line drawing period with data for each object to be displayed on the next horizontal line. The data in a specific construction consists substantially of horizontal starting pixel numbers written into the RAM RC and 12 bits of ROM address information and 4 bits of width information written into the RAM RD. A control CA in the A-control section issues a sequence of "writes" during HBLK which causes fast transfer of data from RAM's RC and RD into, respectively, a RAM line buffer and RAM RE, also in the display circuitry. The RAM's RC and RD are loaded from the input RAM RB.

The game microprocessor does not have to provide a complete map of the display and is therefore free to devote most of its time to game control functions. The game microprocessor need only identify the objects to be presented and their screen locations during VBLK. There is therefore no great burden upon the microprocessor in handling large numbers of variable size objects.

The specific construction described herein is designed to manipulate up to 32 objects at a time. The limiting factor is the speed of the CPU/sequencer, which is governed by the basic clock rate. The speed could be increased by an order of magnitude by use of a different technology than used in the present specific construction, e.g. emitter coupled logic. The limitation to 32 objects is therefore not inherent to the invention.

Persons skilled in the art of video game construction will therefore appreciate that one object of the present invention is to provide a substantially self-contained circuit which can economically control the display of a large number of objects on a color video screen.

Another object is to provide control circuitry which substantially frees the game microprocessor from display duties and thereby permits the microprocessor to devote its time to game-associated computations.

Other objects, advantages and features of the invention will become readily apparent from the following detailed description particularly when taken in conjunction with the accompanying drawings.

BRIEF DESCRIPTION OF THE DRAWINGS

FIG. 2 is a circuit diagram of a specific construction of the clock with disable section of the CPU/sequencer shown as a block in FIG. 1;

FIG. 3 is a circuit diagram of a specific construction of the timing-reset section of the CPU/sequencer shown as a block in FIG. 1;

FIGS. 6-1 through 6-3 show a circuit diagram of a specific construction of the micro-sequencer section of the CPU/sequencer shown as a block in FIG. 1, related as shown in FIG. 6-4;

FIGS. 7-1 and 7-2 show a circuit diagram of a specific construction of the input RAM RB section of the CPU/sequencer shown as a block in FIG. 1, related as shown in FIG. 7-3;

FIGS. 8-1 to 8-3 show a circuit diagram of a specific construction of a sub-section of the CPU/sequencer of the ALU section of the CPU/sequencer shown as a block in FIG. 1, comprising an ALU, an A-latch, and a B-latch, related as shown in FIG. 8-4;

DETAILED DESCRIPTION OF A PREFERRED EMBODIMENT

Figure 1:
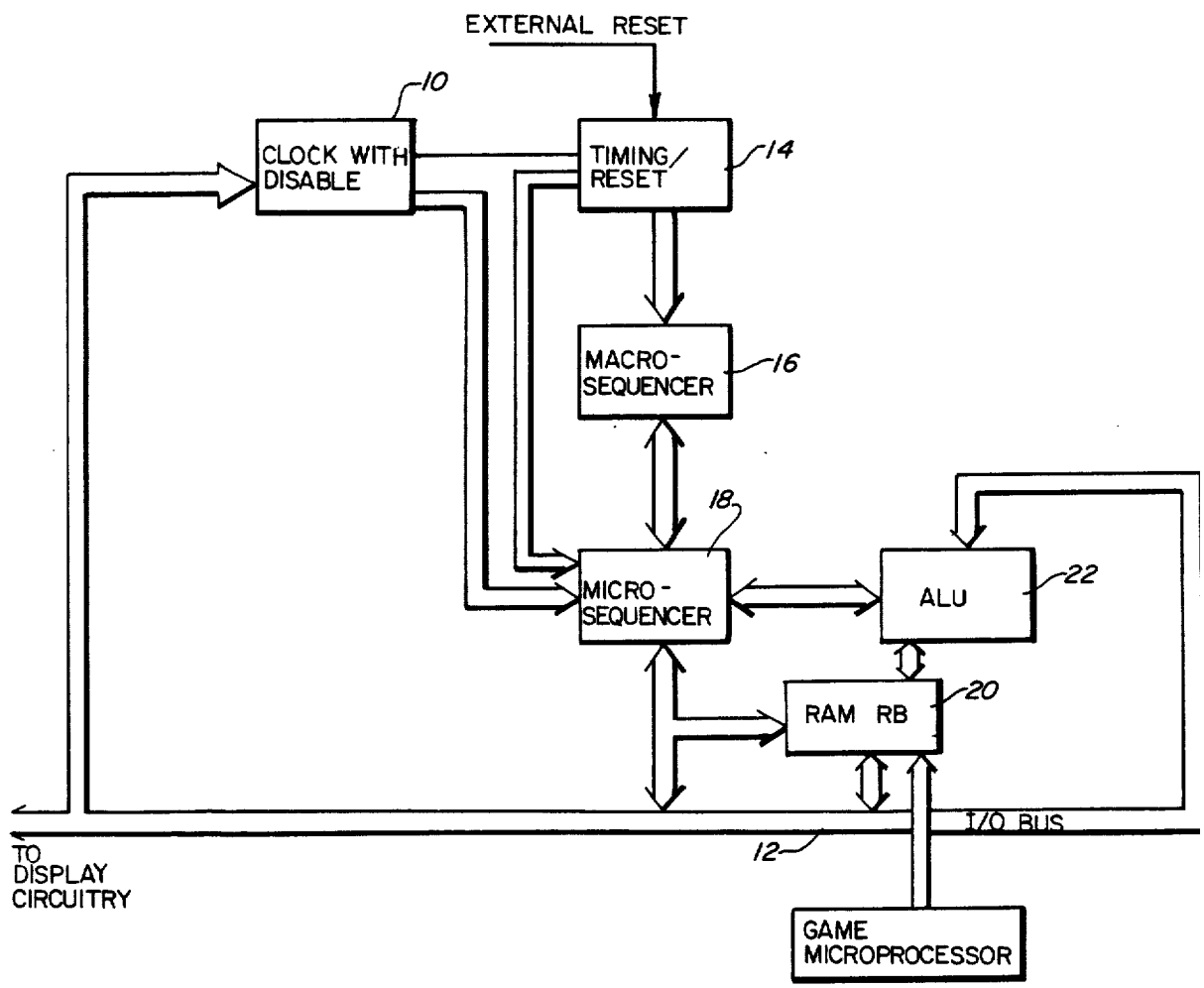
FIG. 1 is a diagrammatic illustration of the major components of a preferred embodiment of a CPU/sequencer for use with a display circuit for a video game in accordance with the present invention.

The schematic drawing in FIG. 1 illustrates by way of example the functional components of an embodiment of the present invention. It should be understood that the particular embodiment shown is intended for use with the general purpose display circuitry for video games of the concurrently executed and filed application. In the example shown there is a game microprocessor that performs calculations responsive to player input and generates data governing the display. That is, the output of the game microprocessor to the display circuitry determines which of a selection of object images are to be displayed, and what the display positions are to be on a game video screen.

The microprocessor communicates with the display circuitry for a brief time during vertical blanking. The display circuitry includes as one component the CPU/sequencer of the present invention. The CPU/sequencer, which has its own clock disable 10, communicates with the remainder of the display circuitry over an I/O bus 12 as illustrated in FIG. 1. The display circuitry carries signals over the I/O bus 12 which enable the clock with disable 10 near the end of the vertical blanking period. An external reset signal carried on the I/O bus 12 enables a timing/reset circuit 14 at approximately the same time that the clock with disable 10 is enabled.

Enabling of the clock with disable 10 and activation of the timing reset circuit 14 have the effect of activating the CPU sequencer. Upon activation of the CPU sequencer, the timing/reset circuit 14 initializes a macro-sequencer 16 and a micro-sequencer 18. Both the macro-sequencer 16 and micro-sequencer 18 include ROM's which are programmed. The macro-sequencer ROM contains a single macro-program comprised of macro-instructions. Each macro-instruction is made up of the data stored at a single address in the ROM in the macro-sequencer. The macro-instructions correspond roughly to "assembly" language instructions in a conventional digital computer as described, for example, in Chapin, N., 360/370 *Programming in Assembly Language*, N.Y., McGraw-Hill, 1973, p. 15.

The ROM in the micro-sequencer contains groups of micro-instructions, each group corresponding uniquely to one of the macro-instructions in the macro-sequencer. Each micro-instruction is made up of the data at a single address in the micro-sequencer ROM. The micro-instructions are analogous to the machine language instructions in a conventional computer as described by Chapin.

Each micro-instruction controls the read/write of RAM memory in the display circuitry and of input RAM RB 20 in the CPU/sequencer. The micro-sequencer instructions also control an arithmetic logic unit 22 and the sequencing of the instructions in the macro-sequencer 16. The game microprocessor communicates directly with the input RAM RB 20 and places display information into the input RAM RB 20 during the brief "handshake" interval of the vertical blanking period.

It may be seen, consequently, that the CPU/sequencer comprises in effect a microcomputer dedicated to perform display circuitry functions. Unlike microcomputers, however, the CPU/sequencer may be programmed at both the micro- and macro-level by the game designer. Game or display variations may also be readily implemented simply by replacing the ROM's in the macro-sequencer 16 and micro-sequencer 18. Furthermore, unlike conventional microprocessors, the CPU/sequencer of the present invention may have an arbitrarily large number of output channels simultaneously controlled. Thus, the embodiment exemplified in FIG. 1 simultaneously controls 24 bits of output. The embodiment exemplified in FIG. 1 is further distinguished from conventional microprocessors in that it may run at a very high clock rate with the micro-sequencer thus putting data on its 24 channels simultaneously at each rise of the clock signal from the clock with disable 10. The clocking rate in the instant embodiment is MHz.

Other features distinguishing the CPU/sequencer of the present invention from prior art microcomputers will be evident in the course of the more detailed description to follow.

The interrelationship of the components illustrated in FIG. 1 may be better understood in the context of the presentation of a single display on the screen of a raster scan display monitor during a video display. Prior to the beginning of the display presentation, during the VBLK period, the game microprocessor transmits data to the video display circuitry. The data may consist principally of the identities and screen locations of objects to be displayed on the monitor screen during the forthcoming display in accordance with the play of the game. In other embodiments of the invention other information, for example, object size and orientation, may also be transmitted.

Approximately 63 microsec., the time for sweeping a single horizontal line, prior to the end of VBLK the display circuitry may generate signals to enable the clock with disable 10. The clock with disable 10 then provides digital clock signals required for operation of the CPU/sequencer. These digital clock signals are generally independent of the clock signals used by the game microprocessor but may be synchronized with display circuit clock signals. The game playing circuitry and display circuitry thereby operate independently of each other.

The clock with disable 10 provides clock signals having a period substantially shorter than the cycle time of commercially available microprocessors. The short period characteristic of these clock signals is related to the high speed feature of the CPU/sequencer of the present invention.

The display circuitry transmits its signals enabling the clock with disable 10 over the I/O bus 12. The I/O bus 12 provides communication between the display circuitry and the CPU/sequencer. The display circuitry also transmits an external reset signal over the I/O bus 12 to the timing-reset circuit 14 substantially concurrently with the clock enabling signals. The timing-reset circuit then generates signals used with the digital clock signals to initialize the macro-sequencer 16 and micro-sequencer 18. The clock with disable 10 and timing-reset circuit 14 thereby comprise a digital clock means responsive to the display circuitry for generating signals, including digital clock signals, the digital clock signals having a period substantially shorter than the game microprocessor cycle time.

The macro-sequencer 16 responds to the initializing signals by reading out to the micro-sequencer 18 data comprising the contents at a first address in a ROM A part of the macro sequencer 16. The micro-sequencer 18 responds to the data from the macro-sequencer 16 by reading out in sequence data comprising the contents at a first series of adjacent addresses in a ROM B in the micro-sequencer 18. The data from the ROM B is read out on a plurality of output channels, some of which are connected to the RAM RB 20, some to the ALU 22, and some to the display circuitry. There are also output channels from the micro-sequencer 18 leading to the macro-sequencer 16.

The data on the output channels to the RAM RB causes the RAM RB to read out the starting position of a first object in a display list written by the game microprocessor. The ALU 22 then responds to the data on the output channels by determining whether the object is to be displayed on the next, in this case the first, line of the display, utilizing video display data available on the I/O bus 12 from the display circuitry. The macro-sequencer 16 then responds to the data on the output channels by addressing a new address in ROM A depending upon whether or not the first object is to be displayed. Each address in ROM A causes the macro-sequencer to output data initiating the addressing of a sequence of addresses in ROM B. The macro-instructions in the macro-sequencer 16 ROM A thereby control the execution of sequences of micro-instructions in the micro-sequencer 18 ROM B.

If the first object is not to be displayed then the macro sequencer 16 causes the micro-sequencer 18 to continue checking whether other objects in the display list are to be displayed on the next line. When such an object is found then the macro-sequencer 16 causes the micro-sequencer 18 to effect a data transfer within the display circuitry and then to continue checking for other objects to be displayed on the next line until the display list is exhausted. The data transfer enables the display circuitry to draw the first line of the display in the manner described in the co-pending application.

When the display list is exhausted, as described, then the clock with disable 10 is disabled, disabling the micro-sequencer. The clock with disable 10 is then enabled again at the beginning of the next line, and the process of checking objects and transferring data is repeated line by line until the display is completed.

The data on the output channels of the micro-sequencer 18 changes at the rate at which the ROM B is addressed, which is the rate of the digital clock signals from the clock with disable 10. That data controls the ALU 22 which operates at the same rate, utilizing data from the I/O bus 12 and the RAM RB 20. The data in ROM B may be altered to conform to the needs of a particular game or a particular display circuit. Use of memory other than ROM is also envisioned to be in keeping with the principles of the present invention. The micro-sequencer 18 and ALU 22 thereby comprise micro-sequencer means responsive to the video display data and macro-instructions including a memory containing a plurality of predetermined sequences of user programmable micro-instructions, means for executing the micro-instructions in response to digital clock signals, and a plurality of output channels for carrying binary data between the CPU/sequencer and the video display circuitry and the macro-sequencer 16.

The ROM A memory in the macro-sequencer 16 may also be altered to conform with the needs of a particular game or display circuit. The use of memory other than ROM in the macro-sequencer 16 is also in keeping with the principles of the present invention. It may be seen, therefore, that the macro-sequencer 16 compriser macro-sequencer means including a memory containing user programmable macro-instructions in a predetermined sequence and readout means for reading respective groups of sequential macro-instructions in response to digital signals, the readout means being responsive to signals from the digital clock means.

The components described functionally in the foregoing example of an embodiment of the present invention may be realized in accordance with the following more detailed description.

CLOCK WITH DISABLE 10

Figures 1, 6:
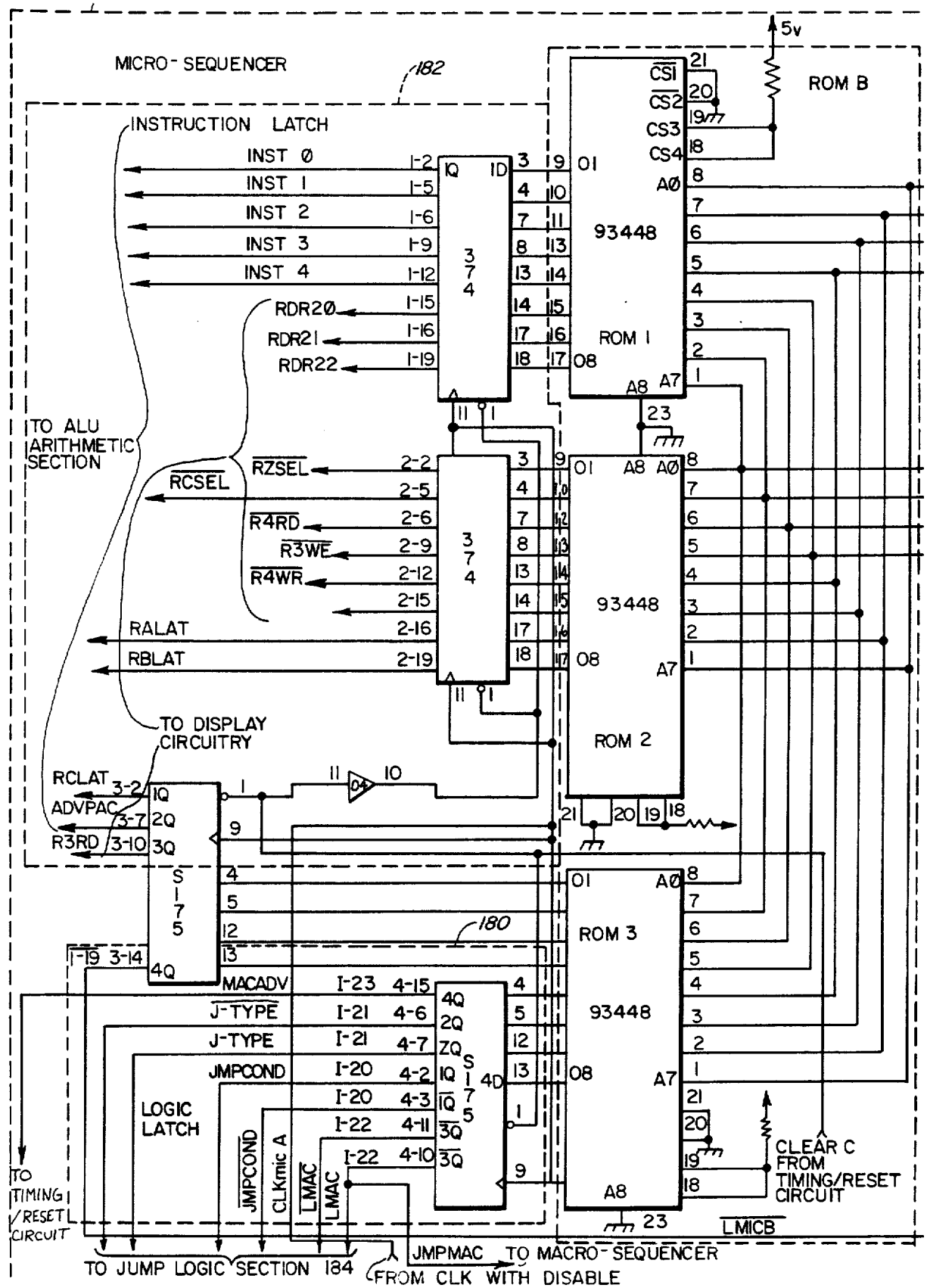
Figures 2, 6:
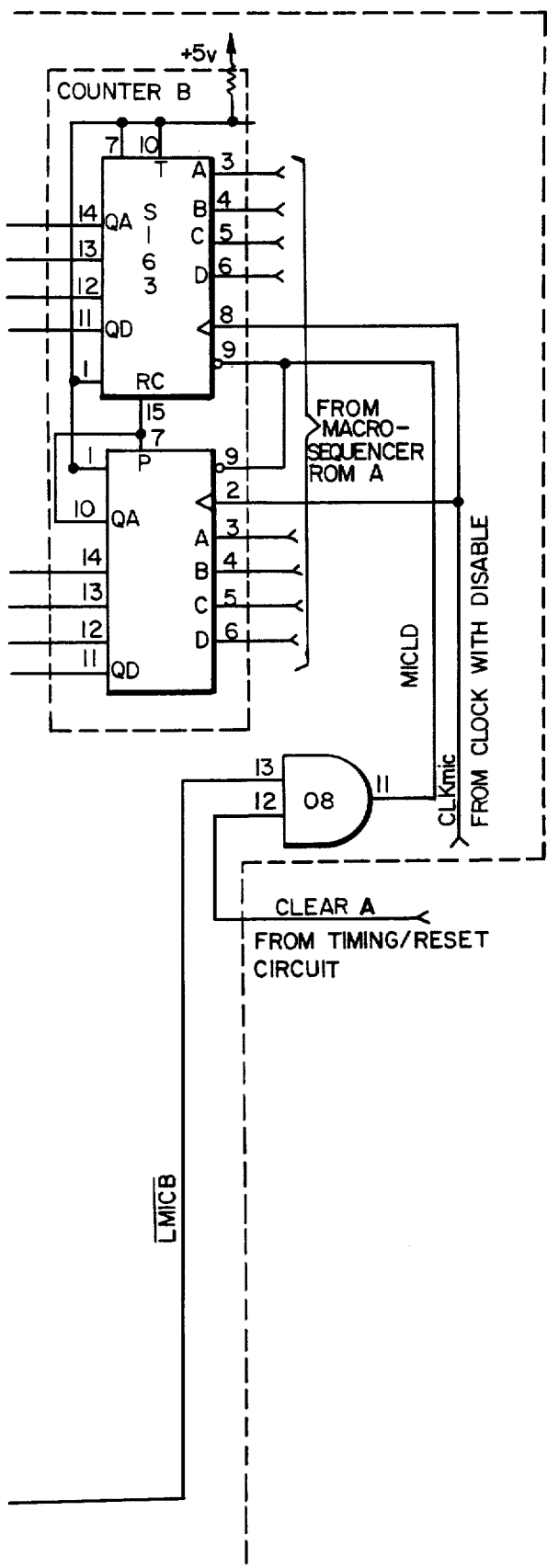
Figures 4, 6:
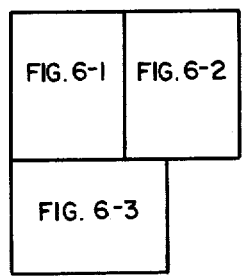

As illustrated in FIG. 2A, a particular construction of the clock with disable 10 of the embodiment utilizes a 50 ns. clock, input to a D flip-flop such as to pin 3 of a type 7474 D flip-flop with clear pin 1 and preset pin 4. (In FIG. 2, as in the other drawings, the initial "74" of integrated circuit numbers is omitted, as is customary in such circuit drawings). When the input to preset pin 4 is high, the D flip-flop with clear and preset provides 100 ns. clock pulses for the sequencer from its Q pin 5. When the preset pin 4 is in a low state, the clock to the sequencer is disabled. Disabling forces the output pin 5 of the flip-flop into a high state. The preset input is supplied by the display circuitry. The display circuitry communicates with the CPU/sequencer over the I/O bus 12, which carries an HBLK* signal, a DMASEL* signal, a BA5* signal, and the 50 ns. CLK input to the clock with disable circuit 10. The HBLK* signal is the complement of an HBLK signal from the display controller, as is indicated by the "*" symbol in the text and the superior "bar" symbol in the drawings. The HBLK* is low during HBLK. The DMASEL* signal is low during VBLK; it goes high one horizontal line time (about 63.4 microseconds) before the end of a VBLK following the first frame of a display and one-half a horizontal line time before the end of a VBLK following the second frame of a display. The BA5* signal disables the clock 10, and hence, the CPU/sequencer after RAM's RD and RC in the display circuitry are loaded with all data necessary to draw the horizontal line beginning after the next HBLK signal.

The clock circuit provides 100 ns. and 50 ns. clock pulses for the micro-sequencer. The 100 ns. and 50 ns. clock inputs are combined so as to provide time delays between the operations of different portions of the micro-sequencer.

The 100 ns. pulses are generated, in the specific construction, by tying the negative Q* output of the D flip-flop to the D-input and clocking the flip-flop with the 50 ns. clock pulses from a CLK line, as illustrated in FIG. 2.

A CLKmac line carries the 100 ns. pulses from the D flip-flop pin 5 to the timing-reset circuit 14. A CLKmac* signal, comprising an inverted CLKmac signal, is transmitted to the timing-reset circuit 14 on a CLKmac* line. The CLKmac* signal is again inverted to provide a delayed CLKmac signal, shown in FIG. 3.

A CLKmic line carries the 100 ns. pulses to the micro-sequencer. The CLKmic signal is taken from the CLKmac* line and inverted to provide a signal substantially similar to the delayed CLKmac signal. A CLKmicA line provides a second clock for the micro-sequencer. The CLKmicA line in a specific construction may be from the output pin 4 of a NOR gate into which the 50 ns. CLK line and 100 ns. CLKmic line are inputs. The resulting positive pulses on the CLKmicA line will have approximately 25 ns. width and will rise approximately 75 ns. after each rise of the 100 ns. clock pulses. The NOR gate output is fed through an AND gate with input pin 2 tied high to provide an additional small time delay.

TIMING-RESET CIRCUIT 14

Figures 3, 6:
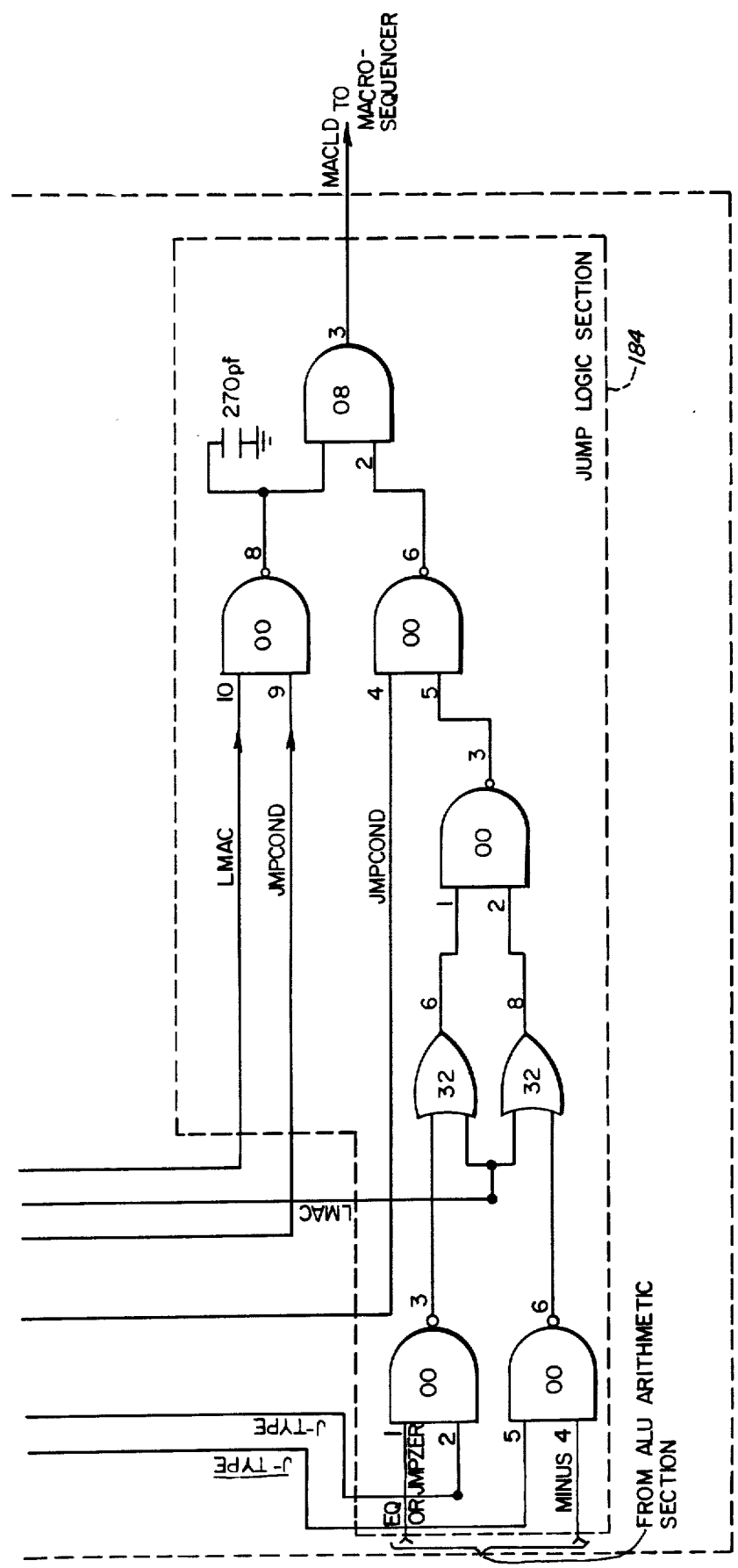

The timing-reset circuit 14 illustrated in FIG. 3 provides control signals for the macro-sequencer 16 and the micro-sequencer 18. The delayed CLKmac line feeds an input pin 3 of a NOR-B gate which outputs to an OR-B gate input pin 1 on a MAC-CON line. The OR-B gate pin 3 outputs on a CLKadv line which provides control and clock signals for the macro-sequencer 16.

The second input to the OR-B gate is a MACADV line from the micro-sequencer 18 connected to OR-B's input pin 2. Thus, when the output of the NOR-B gate is low, the CLKadv line carries the signal on the MACADV line. Conversely, when the MACADV line is low, the CLKadv line carries the signal on the MAC-CON line.

The second input to the NOR-B gate on its pin 2 is a CLEARB line from a reset counter $Q_B$ output on its pin 13. The reset counter $Q_A$ output on its pin 14 correspondingly controls a CLEARA line. A synchronous 4-bit Texas Instruments 74161 is used as the reset counter in the specific construction described herein.

Inputs to the reset circuit comprise the CLKmac* line and the CLKmac line from the clock with disable 10. The CLKmac line connects to the clock input of a D flip-flop B such as a 7474 with preset and clear and with the D-input pin 12 and clear pin 10 set high. A RESET* line from the I/O bus 12 connects to the preset pin 13 of the D flip-flop B. The RESET* signal goes low when the horizontal counter resets, that is, just prior to display of the first horizontal pixel of a horizontal line, as explained in the concurrently filed application.

The D flip-flop B outputs from its Q-pin 9 on a Q-line. The Q-line connects to the load pin 9 of the reset counter, and the data inputs of the counter are set to the binary number 0001. The two least significant output digits from the counter connect to the counter's enable pin 7 through a NAND-AB gate. An (AB)* line connects the NAND-AB gate's output pin 6 to counter pin 7.

The CLEARA line also carries the signal from the least significant digit output pin 14 of the reset counter to the micro-sequencer 18. The next least significant digit on output pin 13 of the counter is carried on the CLEARB line to the NOR-B gate and to the macro-sequencer 16. The reset counter is clocked by rises on the CLKmac* line.

Figure 3A:
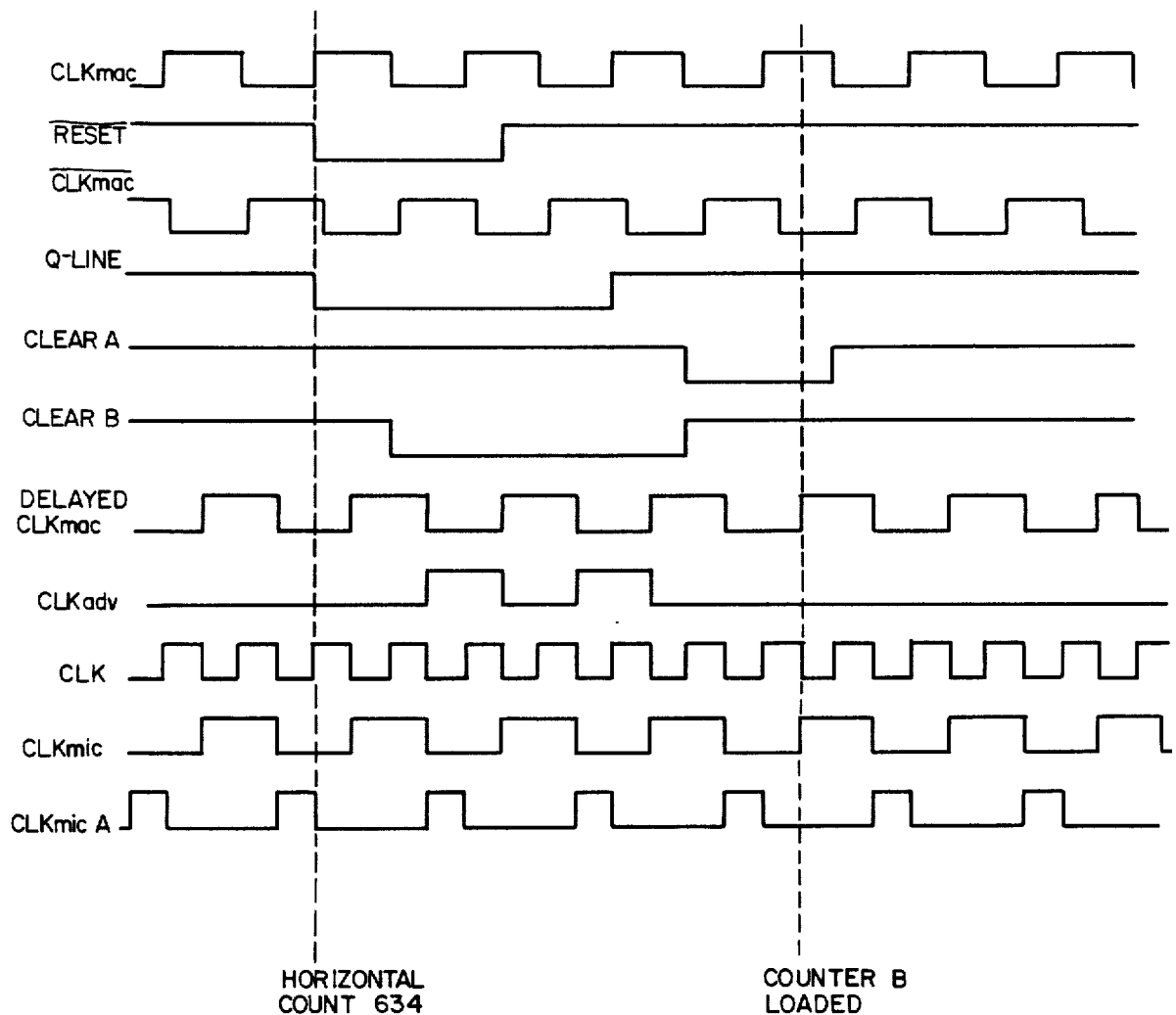
FIG. 3A is a timing diagram showing timing pulses on lines shown in FIGS. 2 and 3 corresponding to a time period during which the timing-reset circuit of FIG. 3 is enabled.

System operation begins with a low signal of more than about 100 ns. duration transmitted from the display circuitry on the RESET* line, as illustrated in the timing diagram, FIG. 3A. When RESET* goes low, the flip-flop B is disabled with its Q-output pin 9 carrying a low to the reset counter's load pin 9. The low on the Q-line disables the reset counter. The first subsequent rise on the CLKmac* line loads the 0001 input data into the reset counter causing $Q_A$ to output a logic high on the CLEARA line and $Q_B$ to output a logic low on the CLEARB line. While $Q_B$ is low the NOR-B gate transmits a pair of 50 ns. high pulses on the MAC-CON line which, as will be discussed, aid in resetting the macro-sequencer 16.

When RESET* transitions to a high, the next rise on the CLKmac line clocks the Q-line to a logic high, enabling the reset counter. With the Q-line high the next rising edge of CLKmac* causes the reset counter to be incremented to the count of two, binary 0010. The CLEARA line thereby makes a transition from high to low and conversely the CLEARB line makes a transition from low to high; both transitions are substantially coincidental with the rising edge of CLKmac*. The consequent 100 ns. low on the CLEARA line illustrated in FIG. 3A will reset the micro-sequencer 18, as will be described.

The last transition of the reset counter on the next rising edge of CLKmac* sets both CLEARA and CLEARB lines high. An AND-C gate outputs the logical product of CLEARA and CLEARB on a CLEARC line to the micro-sequencer latches, thereby enabling those latches. At the same time the enable to the counter is removed by a low on the (AB)* line from the NAND-AB gate. The counter is thereby disabled and the reset cycle completed until another RESET* low pulse is generated.

The CLKadv line carries whatever signal is on the MACADV line except during the 100 ns. positive pulse on the MAC-CON line.

THE MACRO-SEQUENCER 16

Figure 4:
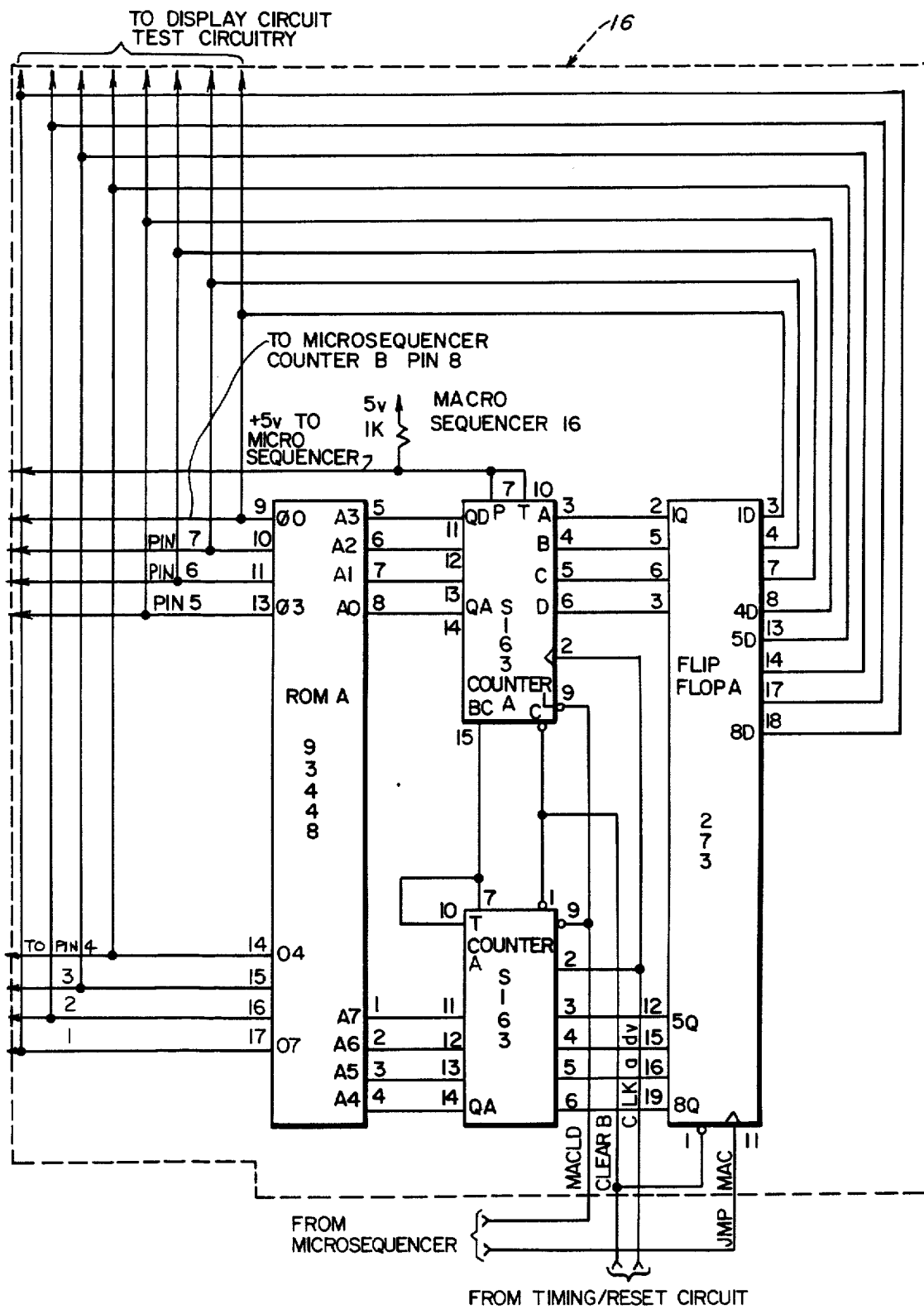
FIG. 4 is a circuit diagram of a specific construction of the macro-sequencer section of the CPU/sequencer shown as a block in FIG. 1.

The macro-sequencer 16 in a specific construction comprises an 8-bit synchronous counter A, a 512×8 bit ROM A, and an octal D flip-flop A with clear as may be seen in FIG. 4. A specific construction may utilize Texas Instruments 74273 flip-flop and 745163 counters in a tandem pair and a Fairchild 93448 programmable ROM.

The CLEARB line from the timing-reset circuit 14 connects to the 8-bit synchronous counter A clear pin 1 and the octal D flip-flop A clear pin 1.

The CLEARB line low has a duration of approximately 200 ns. commencing approximately 50 ns. after the reset counter is enabled. The low logic signal on the CLEARB line sets the outputs of the counter A and the flip-flop A to zero, asynchronously with regard to any clock input.

The outputs of flip-flop A connect to the data inputs of counter A. The outputs of counter A connect to the inputs of the ROM A. The output from ROM A is carried to the micro-sequencer 18, to appropriate test circuits, and back to the inputs of flip-flop A. The outputs of counter A, therefore, immediately after the CLEARB line negative pulse, designate a ROM A address corresponding to the hexadecimal number 00.

The clock input to the flip-flop A is a JMPMAC line from the micro-sequencer 18. The clock input to counter A is the CLKadv line from the NOR-B gate in the timing-reset circuit 14. As explained earlier, the CLKadv line, immediately after the negative pulse on the CLEARB line, carries the signals transmitted on the MACADV line from the micro-sequencer 18. There is also a MACLD line from a jump logic section of the micro-sequencer 18 to the load pins of counter A.

Figure 5:
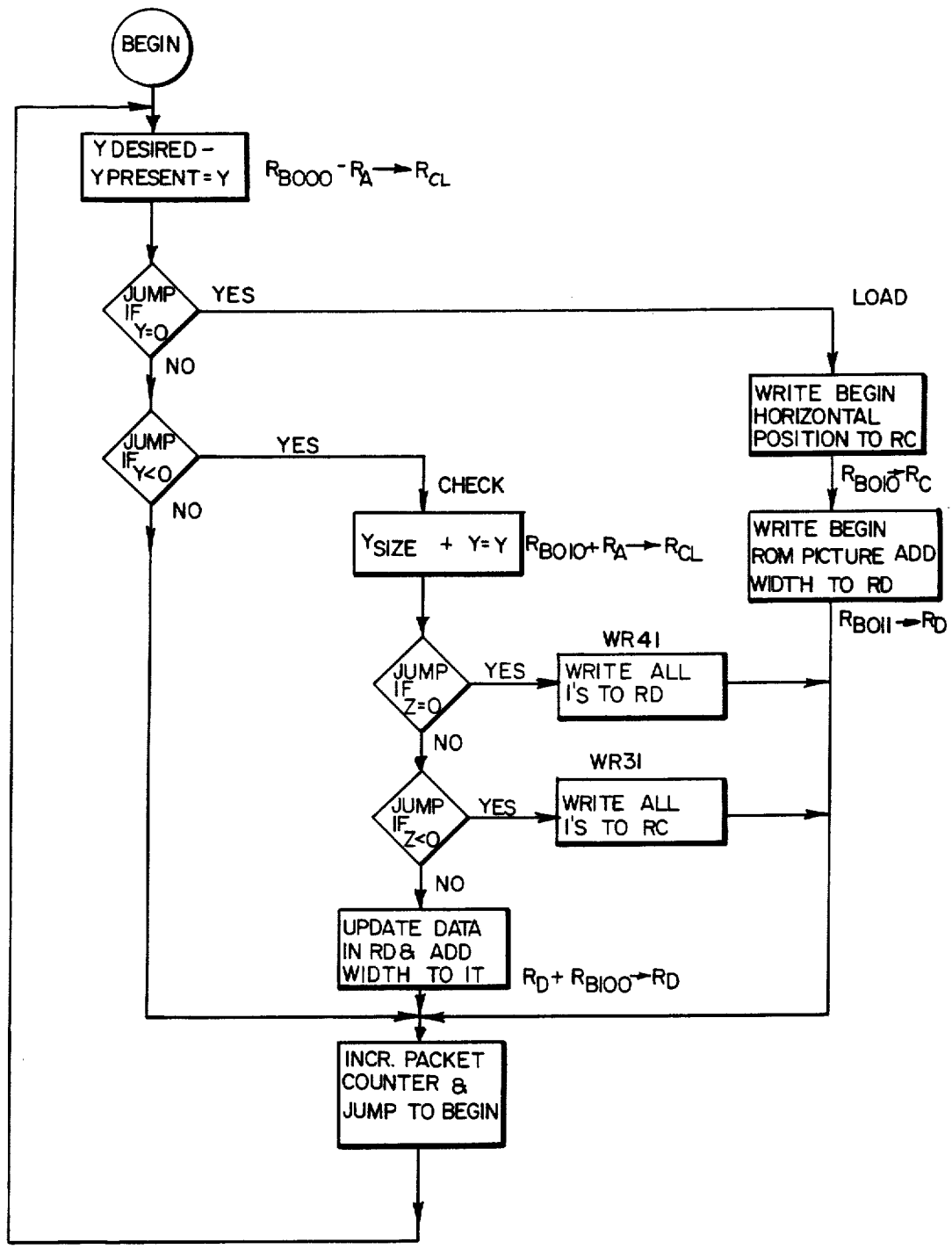
FIG. 5 is a flow diagram showing schematically the contents of the ROM A shown in FIG. 4.

Each address in the ROM A contains an 8-bit macro-instruction which is carried to the data input pins of a counter in the micro-sequencer 18 as shown in FIGS. 4 and 5. After the micro-sequencer 18 has executed the macro-instruction it may cause a pulse to be transmitted on the MACADV line. In that event the counter A will increase its count by 1, thereby addressing the next greater address in the ROM A with its macro-instruction. The macro-instructions are therefore programmable by a user who can substitute a ROM A with prescribed macro-instructions.

If a ROM A instruction to the micro-sequencer 18 requires a conditional or unconditional jump to a ROM A address not in sequence, then the next address in sequence in the ROM A will be the jump destination. The micro-sequencer 18, after receiving the jump instruction, increments counter A by one unit to address the next sequential location in the ROM A. That next sequential location contains the jump destination address which is bussed to the D-input of the flip-flop A. The micro-sequencer 18 thereupon transmits a pulse on the JMPMAC line which clocks the jump destination address onto the input data pins of the counter A. If the jump is to be executed then the jump logic section of the micro-sequencer 18 transmits a low pulse on a MACLD line which loads the destination address into the counter A and, thereby, onto the address pins of the ROM A, completing the jump.

Figure 10:
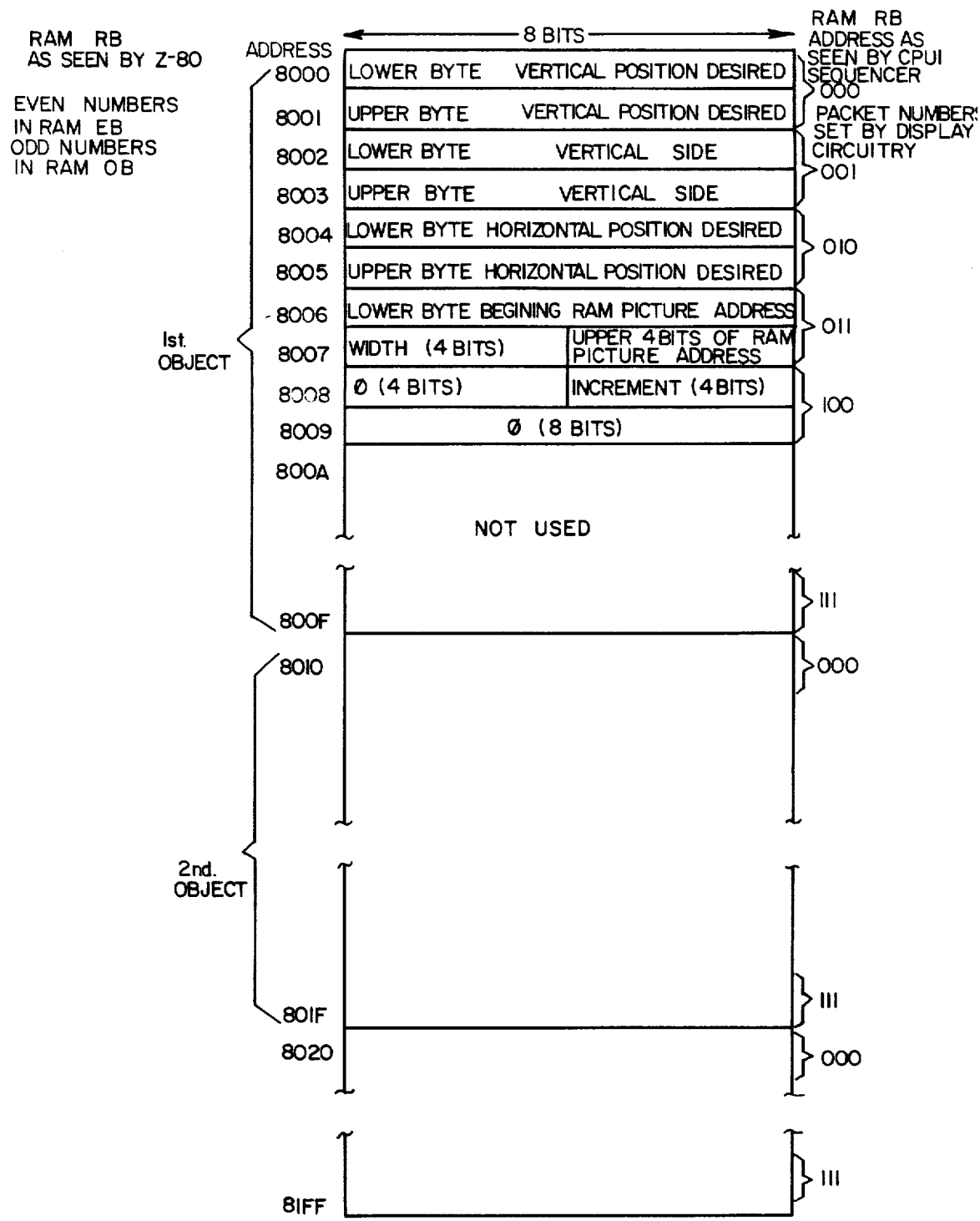
FIG. 10 is a schematic diagram of the contents of the input RAM RB shown in FIGS. 7-1 and 7-2, after update by a game microprocessor.

A flow diagram for a macro-sequencer program utilizable in the context of a video game with an embodiment of the invention described in the previously mentioned co-pending application is shown in FIG. 5. In the figure the "Y" symbol represents a vertical line number as indicated by an appropriate subscript. The R symbols alongside the boxes indicate RAM addresses as explained in the following examples:

$R_B$ 010 is the third address of any object package in RAM RB addressing a 16 bit word defining the horizontal position for display of the corresponding object (see FIG. 10).

$R_A$, $R_C$, $R_D$, respectively, denote the contents of RAM's RA, RB and RC. RAM RA in the display circuitry is a register containing the current vertical position.

$R_{CL}$ denotes a C-latch in the ALU section 22 of the CPU/sequencer.

THE MICRO-SEQUENCER 18

A specific construction of the micro-sequencer 18 is illustrated in FIGS. 6-1 to 6-3, arranged in accordance with FIG. 6-4. The micro-sequencer 18 comprises a logic latch 180, an instruction latch 182, a jump logic section 184, a counter B, and a ROM B.

LOGIC LATCH 180

The logic latch 180 in a specific construction of the embodiment illustrated in FIG. 6-1 comprises five D flip-flops with simultaneous clear and complementary outputs. The latch may comprise the four flip-flops of a first Texas Instruments 74S175 quadruple flip-flop and the fourth flip-flop of a second such quadruple, as illustrated in the figure. The outputs of the logic latch control the sequencing of operations of the micro-sequencer 18 and macro-sequencer 16. The MACADV line also carries an output from the logic latch 180.

The CLEARC line connects to the clear pins 1 of the logic latch 180. When the CLEARC line is low, as occurs after RESET* is set low, the logic latch 180 is cleared thereby inactivating the system.

The logic latch 180 is clocked at its clock pins 9 by the CLKmicA line from the clock with disable circuit 10. The input data for the latch are 5 bits of data from ROM B. The specific construction illustrated outputs eight bits of data from the logic latch 180, making use of the complementary outputs. The following set of signals comprises the data latch output:

| | |
|---|---|
| LMICB* | JTYPE* |
| JMPCOND | LMAC |
| JMPCOND* | LMAC* |
| JTYPE | MACADV |

A "logic instruction", therefore, may be described by specifying the five bits: MACADV, LMAC, JTYPE, JMPCON, LMICB*, in the order just listed, the logical complements being implied.

INSTRUCTION LATCH 182

The instruction latch 182 in the specific construction illustrated in FIG. 6-1 comprises nineteen D flip-flops with simultaneous clear. The instruction latch 182 is also cleared by the CLEARC line and clocked by the CLKmicA line. The latch may comprise a pair of Texas Instruments 74S374 octal flip-flops and the three flip-flops of the second 74S175 not used by the logic latch 180.

Input to the instruction latch 182 is the 19 least significant bits of output from ROM B. Some of the latch outputs connect to the arithmetic section 22. The remainder comprise the interface lines between the high speed CPU/sequencer and memory units in the display circuitry controlled by the high speed CPU.

There are nine output lines from the instruction latch 182 that control the game circuitry memory units in the specific construction described in the concurrently filed application.

Figures 1, 7:
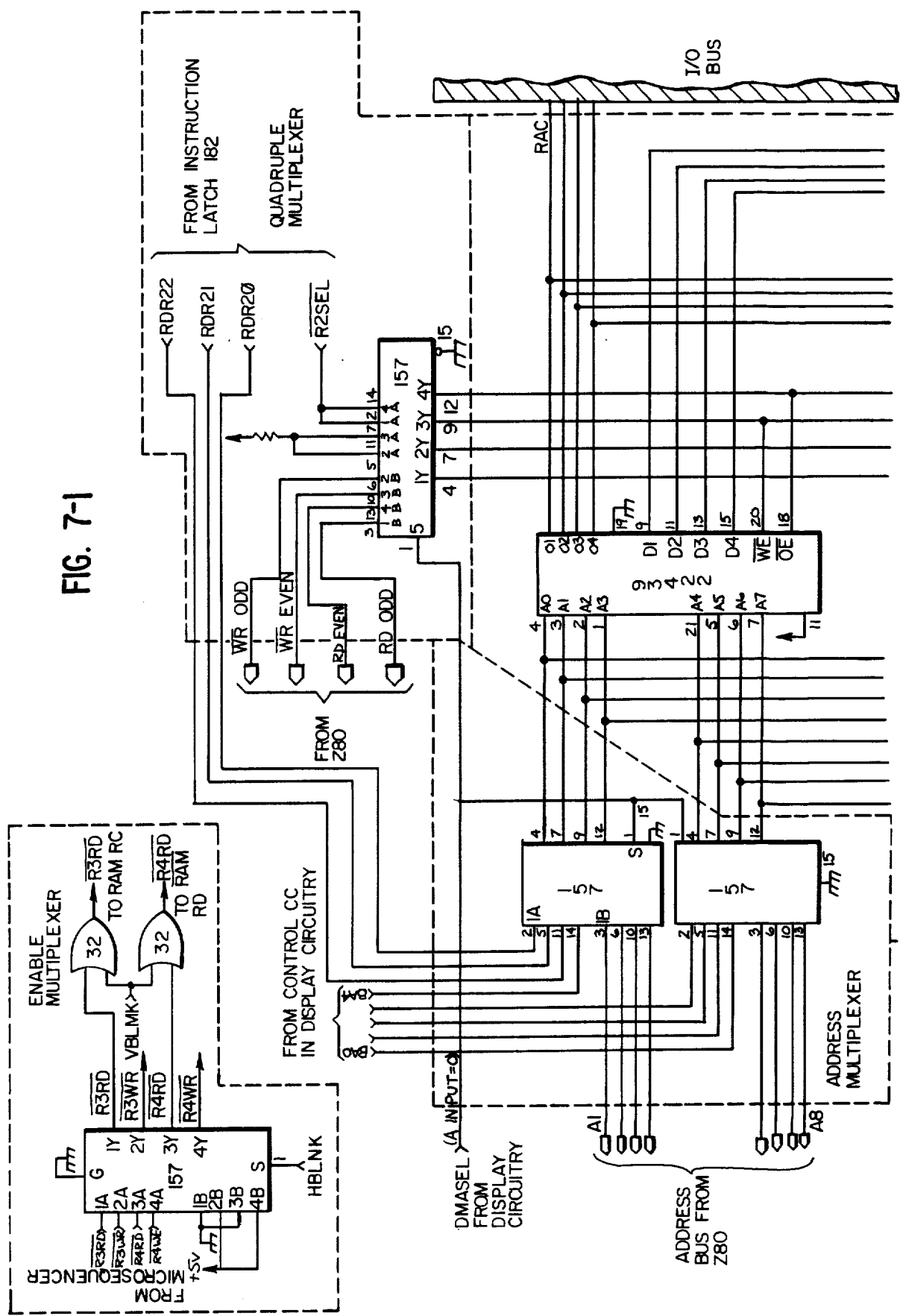

Denoting the octal flip-flops as 1, 2, and 3, the nine game control lines comprise RDR20, RDR21, and RDR22 lines from pins 1-15, 1-16, and 1-17 address the 3 least significant address bits of RAM RB in the general purpose controller circuitry through a first 1-of-2 address multiplexer in the controller (FIG. 7-1). The RAM RB is shared by the high speed CPU/sequencer and the game control microprocessor.

An R2SEL* line from pin 2-2 connects to two A-input data pins of a second 1-of-2 quadruple multiplexer in the general purpose controller (FIG. 7-1). The corresponding two outputs of the quadruple multiplexer enable the output of RAM RB when the R2SEL* line is low and the A-inputs to the second multiplexer are selected by the color controller logic.

An R4RD*-line from pin 2-6 and an R4WR*-line from pin 2-12 enable the reads and writes, respectively, of RAM RD in the general purpose controller. An R3RD* and R3WR*-line from pins 3-10 and 2-19, respectively, similarly enable the read-writes of RAM RC. An R1SEL*-line from pin 2-15 is used to enable RAM RA. An ADVPAC line from pin 3-7 is used to enable the control CA in the display circuitry, as also described in the concurrently filed application.

The R3WR*, R3RD*, R4WR*, and R4RD* signals are all interfaced to the general purpose controller through the A-inputs of a 1-of-2 enable multiplexer shown in FIG. 7-1. The A-inputs are selected when the horizontal blanking signal in the general purpose controller is off. The B-inputs, which are set to enable the RAM RC and RAM RD to read out, are selected during horizontal blanking.

The remaining 10 bits of output from the instruction latch 182 control the arithmetic section 22. These bits (and pin numbers) are designated INST0 (1-2), INST1 (1-5), INST2 (1-6), INST3 (1-9), INST4 (1-12), RALAT (2-16), RBLAT (2-19), RCLAT (3-2), and RCSEL* (2-5).

JUMP LOGIC SECTION 184

The logic latch 180 outputs to the jump logic section 184 as illustrated in FIG. 6-3. The jump logic section 184 also receives inputs from the ALU arithmetic section 22 on an EQ or JMPZER line and a MINUS line.

The MACLD line is an output from the jump logic section 184. It will be recalled that a low pulse on the MACLD line loads counter A with a destination address for a jump. The logic section causes the MACLD line to go low only if LMAC is high, and also:

JMPCOND=0; or  (1)

JMPCOND=1 and either  (2)

JTYP=1 and JMPZER or EQ=1, or  (2b)

JTYP=0 and MINUS=1  (2c)

The logic section also controls a MICLD line which disables and loads counter B whenever the line goes low. The MICLD line is low whenever LMICB*=1 and CLEARA=0; or  (3a)

LMICB*=0 and CLEARA=1  (3b)

It will be recalled that the CLEARA line is normally high. The LMICB* line is normally high.

COUNTER B AND ROM B

The counter B is clocked by the CLKmic lines and loaded by the MICLD line as described earlier and illustrated in FIG. 6-2. The input pins of counter B are connected to the output pins of ROM A in the macro-sequencer 16 as shown in the figure. A low pulse on the MICLD line therefore loads the contents of a ROM A address into the counter B. At the end of the low pulse the counter B then counts upward on each rise of the signal on the CLKmic line.

In a specific construction, the counter B comprises a pair of 74S163 or 74LS163 synchronous 4-bit counters cascaded to count from 0 to 511 in binary.

The output of counter B is connected to the address pins of ROM B. Each low pulse on the MICLD line therefore causes the counter to begin addressing a sequence of adjacent addresses in ROM B which may be viewed as containing micro-instructions. The output of ROM A at the time of the low pulse on the MICLD line designates the initial ROM B address with its micro-instruction in the sequence of micro-instructions. Each initial ROM B address is therefore properly viewed as a macro-instruction in the ROM A memory. The micro-instructions are therefore programmable by a user who can substitute for ROM B a ROM with other prescribed micro-instructions.

In the specific construction ROM B comprises three Fairchild 93448 programmable read-only memories cascaded to provide 512 24-bit words of storage. These are shown as ROM 1, ROM 2, and ROM 3 in FIG. 6-1. The five most significant bits constitute the input data to the logic latch 180. The remaining 19 bits constitute input data to the instruction latch 182. Because the ROM B outputs 24 bits simultaneously, under control of ROM A, the CPU/sequencer may be considered to be a 24 bit microprocessor.

INPUT RAM RB

In the display circuitry described in the concurrently filed application, the input RAM RB is a shared memory utilized by both the high-speed CPU/sequencer and the remainder of the display circuitry. The sharing is effected by an address multiplexer as described in the concurrently filed aplication and illustrated in FIG. 7-1. A DMASEL line from the input section of the display circuitry that is the complement of the DMASEL* line described earlier selects either the A or B inputs of the address multiplexer. The DMASEL line goes high at the beginning of VBLK and goes low one or one-half horizontal line time before the end of VBLK preceding the first or second frame, respectively, of a display.

The B-inputs of the address multiplexer are fed by an address bus from the game microprocessor. The game microprocessor in the specific construction provides address data to the address bus during vertical blanking of the video output. The DMASEL line therefore selects the B-inputs, by going high at the beginning of vertical blanking. The A-input is selected, just before and during each vertical sweep. When the B-input is selected the game microprocessor provides input data to the in-out pins of RAM RB as illustrated in FIG. 7, thereby causing RAM RB to write game data into its memory.

The five most significant digits of the A-inputs to the address multiplexer are addressed by the output of a control CA counter in the control A section of the display circuitry as shown in FIG. 7-1. This counter is enabled during active video trace and disabled during horizontal blanking. The counter is clocked by high signals on the ADVPAC line from the micro-sequencer 18, each low/high transition incrementing the counter by one. The three least significant bits of the A-inputs are, in order of increasing significance, the signals RDR20, RDR21, and RDR22 from the micro-sequencer 18. Thus, for each count of the control CA counter, incremented by ADVPAC signals, the RDR signals may address eight adjacent words of memory in RAM RB.

In the specific construction, RAM RB comprises 2 pair of Fairchild 93422 random access memories. Each pair is cascaded to provide 256 eight-bit words of memory for input from the microprocessor. The two pair are cascaded to provide for 256 16-bit words of output under control of the micro-sequencer 18.

When the DMASEL line signal selects the A-input of the address multiplexer it also selects the A-inputs of a quadruple multiplexer shown in FIG. 7-1 which is also part of the display circuitry. Two of the A-inputs are pulled up to disable the write mode of the RAM RB. The other two inputs are connected to the R2SEL* line from the micro-sequencer 18; the corresponding outputs connect to the output enable of RAM RB. Thus, when DMASEL selects the A-inputs of the two multiplexers and R2SEL* is low, RAM RB outputs the 16-bit word addressed through the address multiplexer. When R2SEL* is high, and A-inputs, selected, the RAM RA outputs are at high impedance, and, therefore, inactive.

When the DMASEL line signal does not select the A-inputs it necessarily selects the B-inputs which are under the control of the game microprocessor, as already described.

The 16 bits of output of RAM RB are carried on the I/O bus to the arithmetic section 22.

ARITHMETIC SECTION 22

Figures 1, 8:
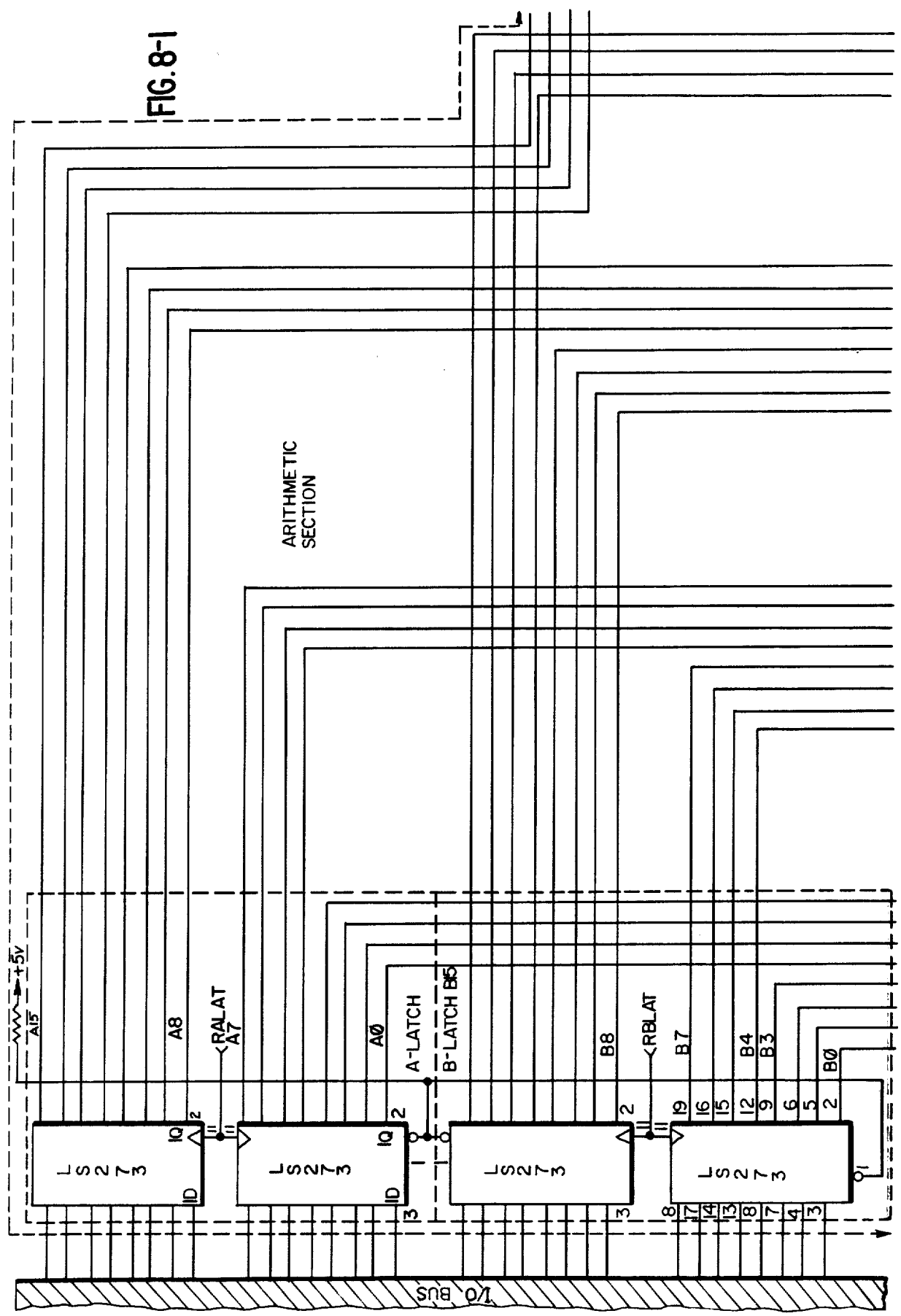
Figures 2, 8:
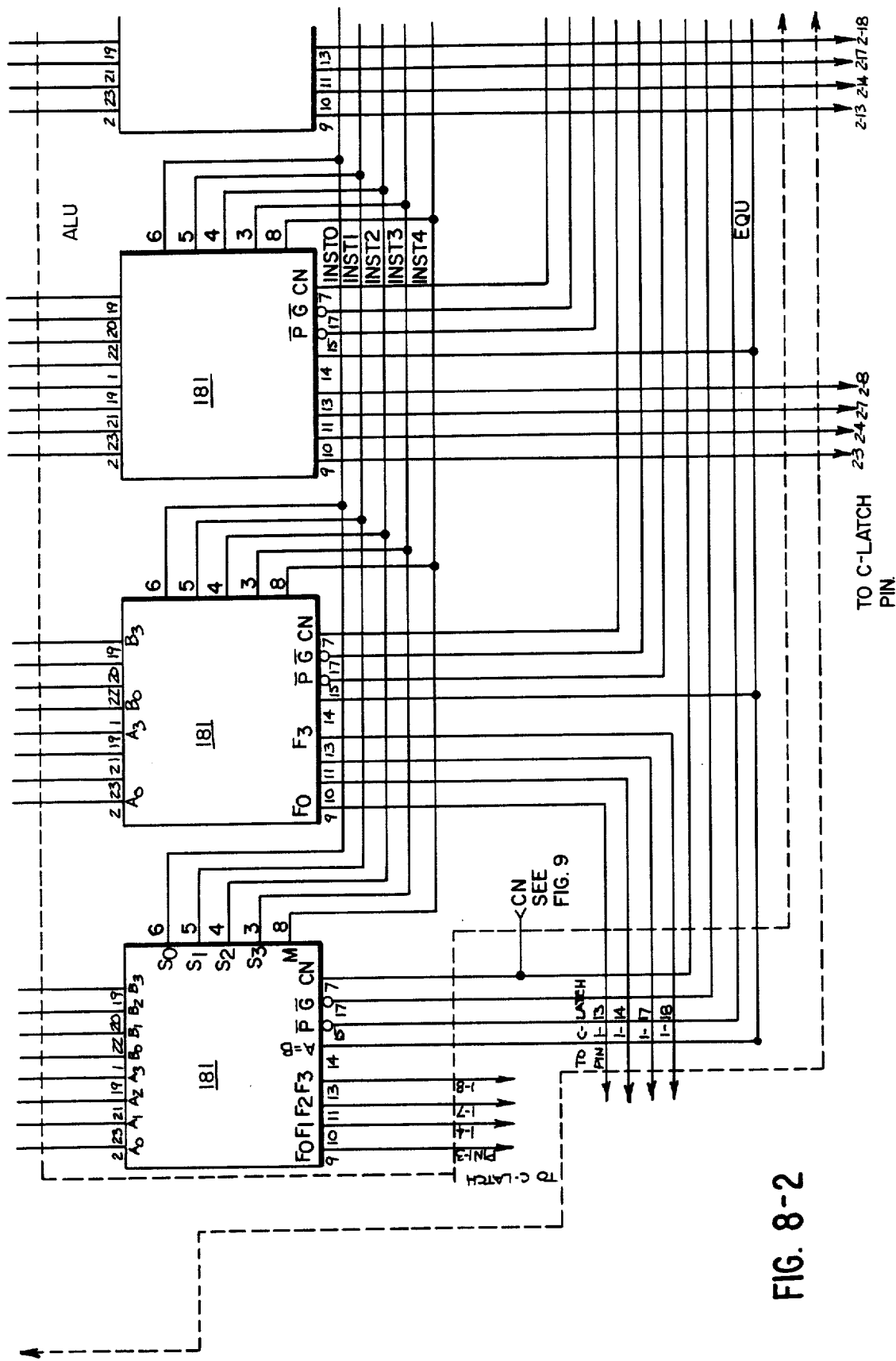
Figures 3, 8:
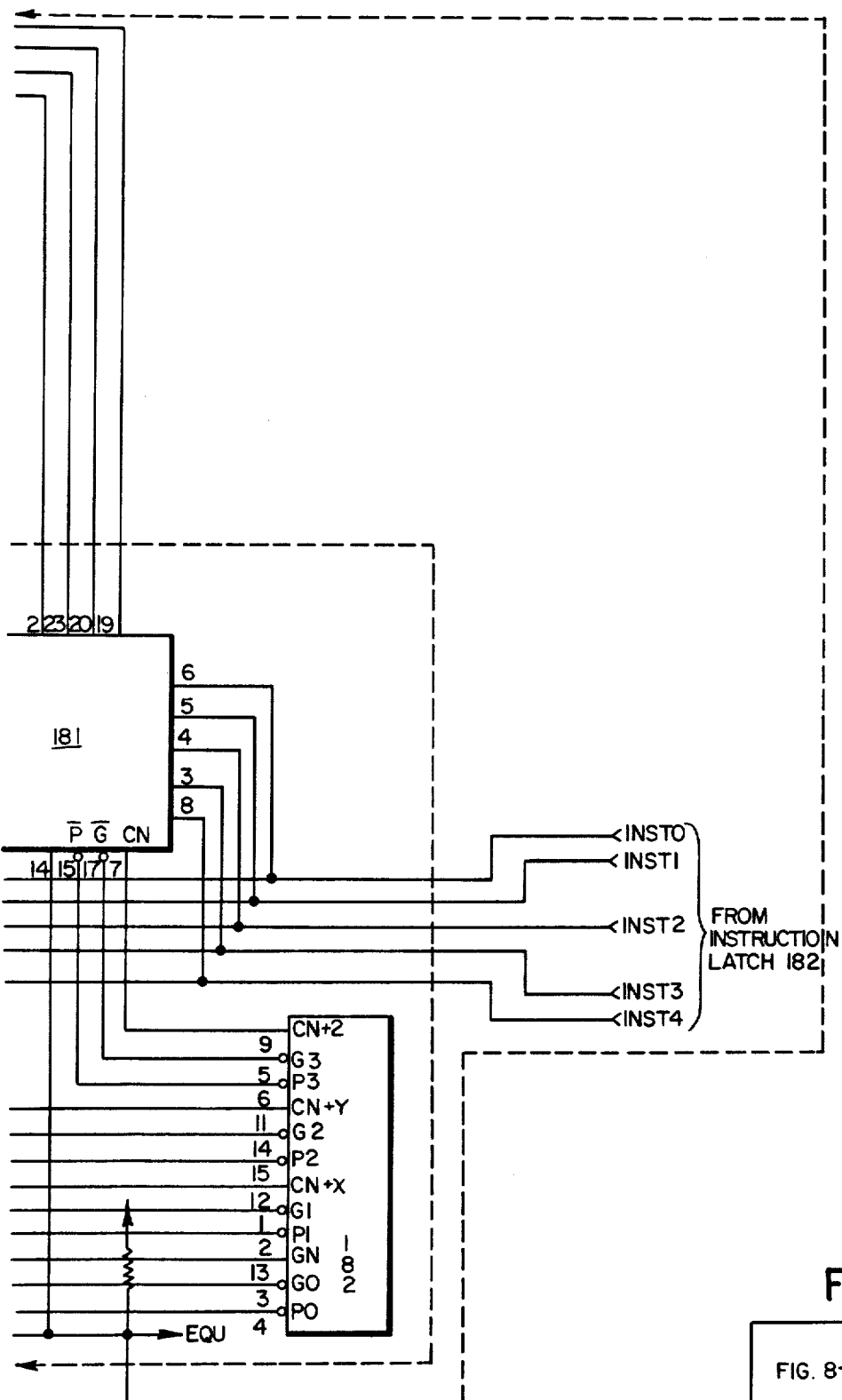
Figures 4, 8:
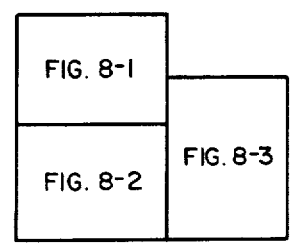
Figure 9:
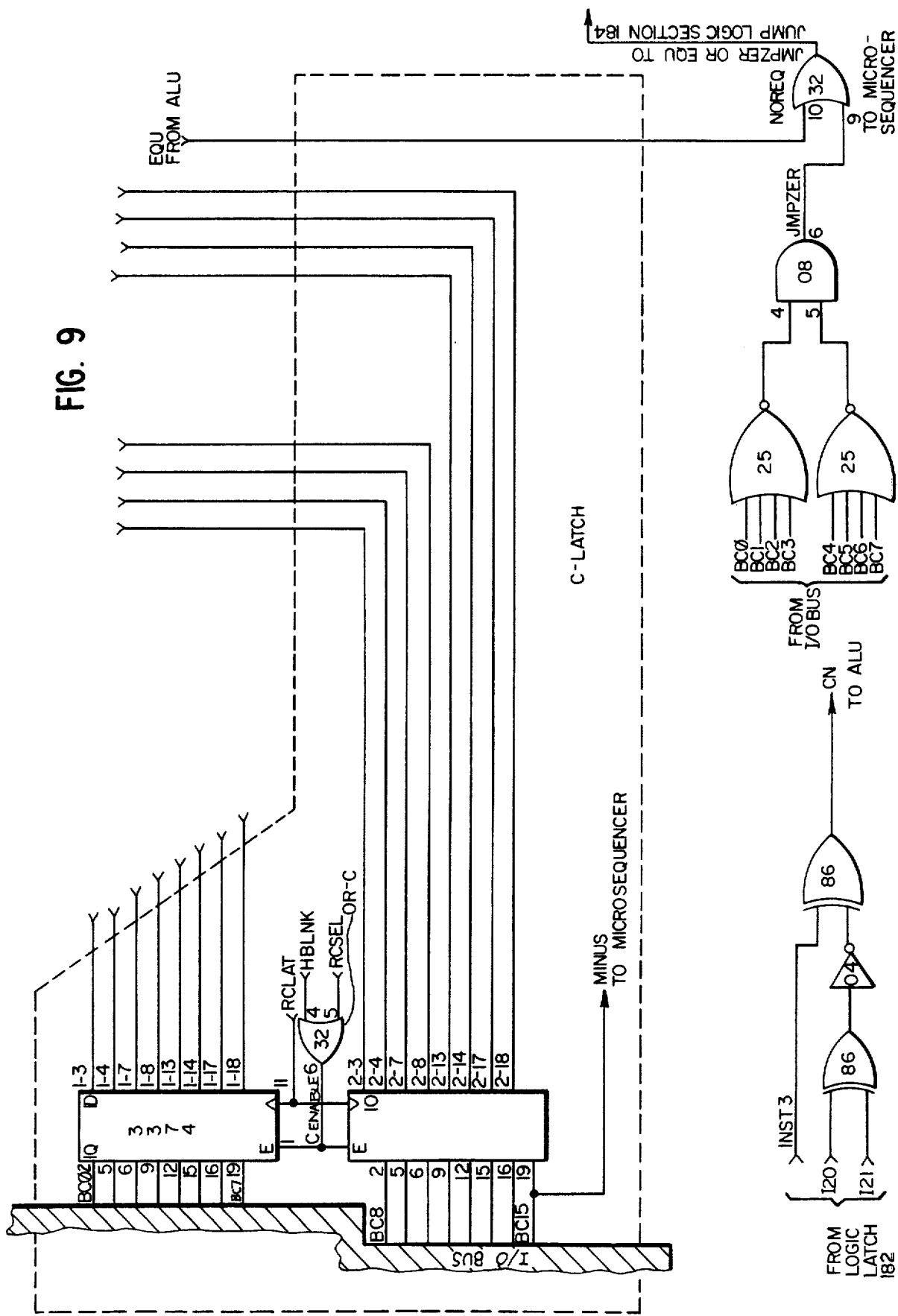
FIG. 9 is a circuit diagram of a specific construction of a sub-section of the CPU/sequencer of the ALU section shown as a block in FIG. 1, comprising a C-latch and associated logic circuits.

The arithmetic section 22 in the specific construction comprises an arithmetic-logic ALU and an A-latch, a B-latch, and a C-latch, as illustrated in FIGS. 8 and 9. FIGS. 8-1, 8-2, and 8-3 are related as shown in FIG. 8-4. The latches connect to the I/O bus, as shown in the figures.

The ALU may include four cascaded 74181 arithmetic logic units/function generators and a 74182 look-ahead carry generator such as are available from Texas Instruments, Inc. The function terminals of the ALU receive the signals INST 0, INST 1, INST 2, INST 3, and INST 4, from the instruction latch 182, and a CN signal generated by a logic gate described in connection with system operation. The A-input terminals of the ALU comprise 16 bits of data passed from the I/O bus through the A-latch. The B-input terminals comprise 16 bits of current data from the B-latch. The 16 bits of output from the ALU are carried to the I/O bus through the C-latch.

A separate output activates the EQ line to pin 10 of a NOREQ gate shown in FIG. 9, setting the EQ line high when the A- and B- inputs are equal. The EQ line otherwise carries a low logic signal.

The A-latch is clocked by signals on the RALAT line from the micro-sequencer 18, the B-latch by signals on the RBLAT line, and the C-latch by signals on the RCLAT line. The A-latch and B-latch in the specific construction each include a pair of octal D flip-flops such as Texas Instruments SN746S273's with clear pulled high.

The C-latch may include a pair of Texas Instruments SN746S374 octal D edge-triggered latches clocked by the positive transitions on the RCLAT line. The output of the C-latch is controlled through a CENABLE line, which may place the outputs in either a normal logic state (high or low) when reset is high or in a high impedance state when reset is low. The CENABLE line in the specific construction comprises the output of an OR-C gate with the HBLK line from the I/O bus and the RCSEL line from the instruction section 182 as inputs. The HBLK line is high during horizontal blanking.

The output from the C-latch is carried over the I/O bus to the input pins of a RAM RD.

SYSTEM OPERATION

A sample program in the macro ROM A is described by the flow chart in FIG. 5, which is appropriate to the specific construction of the display circuitry described in the concurrently filed application. Each instruction word in ROM A is a macro-instruction referring to an address in ROM B where the micro-program corresponding to the ROM A macro-instruction is stored, as already explained.

INITIAL CONDITIONS

The CPU/sequencer is disabled during substantially all of vertical blanking, except for approximately one line time before the end of a vertical blank period when active video begins. The transfer of data for the first horizontal line to the video generator is thereby accomplished prior to the display of the first horizontal line of a frame. A high signal on the DMASEL* line from the display circuitry enables the clock with disable 10.

The clock was previously disabled by a low applied to the preset pin 4 of the clock flip-flop, as already described. The low resulted when the logical product (HBLNK*) (DMASEL*) (BA5*) was zero. The HBLNK* line goes low during horizontal blanking; DMASEL* goes low during vertical blanking prior to vertical counts 254.5 and 510.5, as applicable; and BA5* goes low when the CPU/sequencer has completed all data transfer preparatory to displaying a horizontal line after the next HBLK.

The RESET* line carries a low pulse on each 634th horizontal count, at the end of horizontal blanking. These low pulses insure that the timing-reset circuit 14 clears out previous data prior to calculating the next line information. The RESET* also clears the logic and instruction latches 180 and 182, thereby guaranteeing the correct instruction sequence. The start of the low pulse on RESET* commences the reset cycle.

Upon commencement of the reset cycle, the CLEARA line from the timing-reset circuit 14 shown in FIG. 3 goes from high to low for about 100 ns. and then back to high, where it remains, as already described, and as shown in the timing diagram, FIG. 3A. The CLEARB line, it will be recalled, carries a 200 ns. low just prior to the low on the CLEARA line. The CLEARB low begins about 50 ns. after the start of the reset cycle.

The CLKadv line carries a signal satisfying the logic $$CLKadv = (CLEARB + Delayed\ CLKmac)^* + MACADV \qquad (4)$$

The MACADV line is low because it is an output from a cleared latch. The delayed CLKmac line follows the CLKmac signal with a delay of about 12 ns. The CLEARB line makes its transitions on the rising edge of the CLKmac* pulses. The CLKadv line, as a result, carries two approximately 50 ns. high pulses with leading edges spaced 100 ns. apart, the first occurring about 75 ns. after the start of the reset cycle, also as shown in FIG. 3A.

The CLEARB line transmits its 200 ns. low to the clear pins 1 of the counter A. The leading edges of the CLKadv 50 ns. high pulses, which immediately follow the CLEARB line low, clock the counter pins 2 and thereby clear the counter A. Counter A, as a result, addresses word number 00 in ROM A. Counter A is thereby cleared about 175 ns. after the start of the reset cycle as may be seen from FIG. 3A.

The CLEARB line also transmits its 200 ns. low to the clear pin 1 of latch A, causing latch A to output zeros to the data inputs of counter A. The output from ROM A's 00 address is meanwhile on the data input pins of counter B at about the time counter A is cleared. The same data is also fed back to the data input pins of latch A. At the end of the CLEARB 200 ns. low, approximately 75 ns. after counter A is cleared, latch A becomes enabled and is outputting logical lows to the data input pins of counter A.

The CLEARC line is low for 300 ns. while either CLEARA or CLEARB is low. The CLEARC low is applied to the clear pins 1 of the logic latch 180 to clear the logic latch 180. The CLEARC low is also inverted and applied to the output control pins 1 of the instruction latch 182, thereby causing the 74S374 output pins to present high impedance to the output lines. When CLEARA goes high again, CLEARC does so also, and the logic and instruction latches 180 and 182 are enabled approximately when counter A is enabled.

When the logic latch 180 is cleared, the LMICB* line from a complementary output in the logic latch 180 goes high. The MICLD line, which is the logical product of LMICB* and CLEARA carries the CLEARA low followed by a high to the load pins 9 of counter B. The first CLKmic rise during the low then loads counter B with the data on its data pins, namely the output from the ROM A 00 address as is indicated in FIG. 3A. This event occurs about 325 ns. after the start of the reset cycle. Counter B then addresses a location in ROM B designated by the contents of the ROM A 00 address. The output from ROM B is thereby placed on the input pins of the logic and instruction latches 180 and 182. Approximately 25 ns. after counter B is loaded CLEARA goes high and the counter is enabled.

Approximately 50 ns. after counter B is loaded the leading edge of the next positive pulse on the CLKmicA line clocks the ROM B output (designated by the ROM A 00 address) into the logic and instruction latches 180 and 182.

The CPU/sequencer at this point has initiated execution of the programs in ROM A and ROM B.

PROGRAM EXECUTION

First Instruction

Program execution may be understood by following the initial steps described in FIG. 5 in detail, with reference to Tables 2 and 3.

The ROM A 00 address, in the specific construction, contains the binary code for the hexadecimal number 08.

Address 08 in ROM B contains the start of a sequence of three instructions for comparing two numbers. The three instructions may be represented by their heXadecimal equivalents as 241E06, A4DE06, 2D3F06.

ROM B outputs to the logic and instruction latches 180 and 182 as already described. Each six digit hexadecimal number addresses 24 bits of output according to the scheme in Table 1, using instruction 241E06 as an example:

TABLE 1

| Line | Binary Digit | Hex Digit | Line | Binary Digit | Hex Digit |
|------|--------------|-----------|------|--------------|-----------|
| MACADV | 0 | | R3WR* | 1 | |
| LMAC | 0 | | R4RD* | 1 | |
| JTYPE | 1 | 2 | RCSEL | 1 | E |
| JMPCOND | 0 | | R2SEL* | 0 | |
| LMICB | 0 | | RDR22 | 0 | |
| R3RD* | 1 | 4 | RDR21 | 0 | 0 |
| ADVPCK | 0 | | RDR20 | 0 | |
| RCLAT | 0 | | INST4 | 0 | |
| RBLAT | 0 | | INST3 | 0 | |
| RALAT | 0 | 1 | INST2 | 1 | 6 |
| RISEL | 0 | | INST1 | 1 | |
| R4WR* | 1 | | INST0 | 0 | |

The most significant half-bytes, or hex digits, of the sequence 241E06, A4DE06, and 2D3F06 form the sequence 2-A-2. The sequence 2-A-2 corresponds to a jump on the MACADV line, thereby incrementing counter A. Counter A, as a result, outputs a 01 after the second micro-instruction which in turn addresses the 01 address in ROM A. ROM A thereupon outputs the contents of its 01 address to the address terminals of ROM B.

The LMAC line stays low during the Hex sequence 2-A-2. Reference to Eq. (1) shows that the consequence is to keep Counter A in an active state because the MACLD line to the counter load pins stays high. The low on LMAC keeps the jump logic section 184 unresponsive to the JTYPE and JMPCOND line settings.

The 4-4-D sequence in the neXt most significant set of hex digits corresponds to jumps in LMICB and RCLAT on the third micro-instruction. The LMICB jump causes LMICB* to go low according to Eq. (3), thereby loading the output of ROM A into counter B. The jump on the RCLAT line clocks the C-latch in the arithmetic section 22, causing the C-latch to store the output of the ALU.

The sequence 1-D-3 in the third hexadecimal digit indicates deselection of the RAM RD write mode throughout the instruction. (It will be seen that the sequence E-E-F in the fourth digit leaves RAM RD de-selected in any event). The low on R1SEL* on the first two instructions enables the register RA in the display circuitry, causing the register to put the current vertical count on an I/O bus during those two instructions. The high on R1SEL* on the third micro-instruction isolates register RA from the I/O bus at that time.

The RALAT and RBLAT lines go high on the second instruction, clocking the A- and B-latches. The B-latch latches the current vertical count from the I/O bus, putting that count on the B-inputs of the ALU. The A-latch latches data from the I/O bus comprising the vertical position of an object that is to be represented on the screen. The vertical position data is placed on the I/O bus by RAM RB. That vertical position is fed to the A-inputs of the ALU by the A-latch. The result of the arithmetic operation performed by the ALU then appears at the input terminals of the C-latch prior to execution of the third instruction.

The result of the arithmetic operation is then latched into the C-latch by the third instruction, as previously described.

The sequence E-E-F in the fourth digit keeps the RAM RC write disabled as well as RAM RD de-selected. The C-latch remains selected in readiness for the latching operation in the third instruction. After latching, the C-latch output is on the I/O bus.

Meanwhile, the sequence 0-0-1 on the R2SEL* line enables the 16-bit output of RAM RB during the first two instructions and puts that output on the input terminals of the A-latch; the output is latched into the A-latch on the second instruction, as already described.

The sequence 000 in the fifth digit insures that only the first word in each object package is placed on the I/O bus, and that the ALU performs in the arithmetic mode.

As has been explained, the input RAM RB is a 256×16 RAM in the specific construction described herein. The 256 words of storage are partitioned into 32 object packages, as shown in FIG. 10. The microprocessor outputs 8 parallel binary bits and therefore sees RAM RB as a 512×8 RAM, as indicated on the left side of the figure. The even numbered 8-bit words are in a RAM EB, the odd numbered 8-bit words are in a RAM OB. The CPU/sequencer sees only a single RAM RB, as indicated on the right side of FIG. 10. A counter in a control CC of the display circuitry addresses the 5 most significant bits of the RAM RB address input on lines BA0 to BA4, shown in FIG. 7-1. Each count of the control CC counter thereby addresses one of the 32 package locations within the RAM. The three least significant bits of the 8-bit address input designate one of eight 16-bit words within each object package. Thus, on any given count of the counter CC the CPU/sequencer can address only the eight words of a single object package. RAM RB may also be a 128×16 RAM containing 16, instead of 32, object packages, or any other convenient number permitted by the speed of the CPU/sequencer.

The information in each object package is as shown schematically in FIG. 10. The first word in each package is the vertical position of the top of the rectangular frame containing the object to be displayed. Thus when the R2SEL* enables RAM RB to read, in the present example, the package read will be determined by the state of the control CC counter. The word within the package will be determined by the state of bits RDR21, RDR22, and RDR23, in order of increasing significance, which address the three least significant bits of the RAM RB address, as shown in FIG. 7.

The control CC counter in the display circuitry is clocked by rises on the ADVPAC line, as described in the concurrently filed application. In the present example the counter reads 00000 (binary) and consequently addresses the first object package. Also, the three RDR lines addressed by the three most significant bits of the fifth digit are all zeros, corresponding to the first word in the object package, the vertical position of the object. That word has, as already explained, been placed on the A-input terminal of the ALU.

The high on the R2SEL* line during the third instruction disables RAM RB.

The 4th bit (Inst4) designates the ALU's mode, high corresponding to logic and low corresponding to arithmetic. In the present example, therefore, the ALU is in the arithmetic mode.

The sixth digits comprise the last 4 instruction bits. The sequence 6-6-6 controls the ALU and, in the specific construction described, causes it to output the difference of the B and A inputs corresponding to the arithmetic operation B-A.

Other arithmetic instructions may be obtained from the manufacturer's tables for the ALU. The present description is based upon the use of four cascaded Texas Instruments SN74181 arithmetic units used in conjunction with an SN74182 full carry look-ahead circuit, using active high data.

The foregoing explanation shows that the result of the first macro operation corresponding to the instruction in the ROM A 00 address has been to (1) subtract the desired vertical position from the current vertical position in the first object package in RAM RA.

(2) store the result in the C-latch.

(3) commence executing the macro program beginning at RAM A address 01 which is implemented by the micro program beginning at RAM B address 18.

JUMPS

The third macro-instruction at RAM A location 03 is a conditional jump which exhibits additional features related to the invention. The micro-instructions starting at RAM B location 10 may be written as

B43FE6
743FE6
F43FE6
0C3FE6

The rightmost 4 digits show that all RAM's are disabled and the ALU continue to output the difference between the desired vertical position of the first object and the current vertical count.

The sequence B-7-F-0 in the first digit correspond to jumps on the MACADV line at the beginning of the first and third instructions and a high on the LMAC line during the second and third instructions. The JTYPE and JUMPCON lines are high for the first three instructions and low on the fourth.

The first MACADV jump clocks counter A so that it now outputs 04. On the first instruction the high on the JMPCOND line enables the logic circuit in accordance with Eq. (1). From Eq. 2(b) it may be seen that MACLD will go low if JMPZER or EQ are high. Meanwhile, the rise on the LMAC line has clocked latch A so that it is outputting the contents of ROM A address 04, which, it will be recalled, is on the latch A data terminals. If JMPZER or EQ are high, therefore, the contents of ROM A address 04 are loaded into counter A by the MACLD low and the second rise on the MACADV LINE. The contents of ROM A address 04 thus comprises a jump destination address within ROM A.

If JMPZER and EQ are not high then the second rise on the MACADV line merely clocks counter A so that the 05 address in ROM A is addressed. The first three members of the B-7-F-0 sequence thereby comprise a "jump if equal" instruction. The fourth member then inactivates the logic circuit.

The sequence 4-4-4-C in the second digit represents a fourth micro-instruction low on the LMICB* line. That low loads the output of ROM A into counter B after the "jump if equal" decision has been made. The end result is that the "jump if equal" instruction determines whether the contents of ROM A address 05 or the contents of the jump destination address is to be loaded into counter B by the low on the LMICB* line. Counter B will then cause the designated sequence of microinstructions in ROM B to be executed.

TABLE 2 shows the sequence of ROM A instructions corresponding to the flow chart in FIG. 5.

TABLE 2

| ROM A ADDRESS | HEX INSTRUCTION |
|---|---|
| 00 | 08 |
| 01 | 18 |
| 02 | 0B |
| 03 | 10 |
| 04 | 0D |
| 05 | 38 |
| 06 | 18 |
| 07 | 11 |
| 08 | 20 |
| 09 | 00 |
| 0A | 00 |
| 0B | 00 |
| 0C | 00 |
| 0D | 30 |
| 0E | 28 |
| 0F | 00 |
| 10 | 00 |
| 11 | 40 |
| 12 | 00 |
| 13 | 00 |

TABLE 3 shows the contents of ROM B, in the hexadecimal notation previously illustrated, for implementing the instructions in the flow chart.

TABLE 3

| ROM B ADRESS | ROM 3 | ROM 2 | ROM 1 | |
|---|---|---|---|---|
| 000 | A4 | 3F | FF | Jump Unconditional |
| 001 | 64 | 3F | FF | with Packet Increment |
| 002 | E6 | 3F | FF | |
| 003 | 2C | 3F | FF | |
| 008 | 24 | 1E | 06 | $R_1 - R_{B000} \rightarrow R_C$ |
| 009 | A4 | DE | 06 | |
| 00A | 2D | 3F | 06 | |
| 010 | B4 | 3F | E6 | Jump If Equal |
| 011 | 74 | 3F | E6 | |
| 012 | F4 | 3F | E6 | |
| 013 | 0C | 3F | E6 | |
| 018 | 94 | 3D | E6 | Jump If Minus |
| 019 | 54 | 3D | E6 | |
| 01A | D4 | 3D | E6 | |
| 01B | 2C | 3F | E6 | |
| 020 | 24 | 3F | FC | Write All One's to $R_D$ |
| 021 | A5 | 29 | FC | |
| 022 | 20 | 29 | FC | |
| 028 | 24 | 3E | 7A | $R_{B011} \rightarrow R_D$ |
| 029 | 24 | 7E | 7A | |
| 02A | A5 | 3B | 7A | |
| 02B | 2C | 29 | 7A | |
| 030 | 24 | 3E | 5F | $R_{B011} \rightarrow R_C$ |
| 031 | A0 | 36 | 5F | |
| 032 | 2C | 3E | 5F | |
| 038 | 24 | 3C | 26 | $R_C - R_{B001} \rightarrow R_C$ |
| 039 | A4 | FC | 26 | |
| 03A | 2D | 3F | 26 | |
| 040 | 24 | 3A | 89 | $R_D + R_{B100} \rightarrow R_D$ |
| 040 | 24 | 3A | 89 | |
| 041 | 24 | FA | 89 | |
| 042 | A5 | 2B | 89 | |
| 043 | 2C | E9 | 89 | |

The foregoing discussion has been directed to an application of the high speed CPU/sequencer to a general purpose video controller.

It will, of course, be understood that modification of the present invention in its various aspects, as well as other applications, will be apparent to those skilled in the art, some being apparent only after study and others being a matter of routine design. For example, it is not a necessary feature of the present invention that a CPU/sequencer such as the one described herein be used with the particular display circuitry exemplified in the preceding description. Other components than those described may also be used consistently with the principles of the present invention. As such, the scope of the invention should not be limited by the particular embodiment and specific construction herein described, but should be defined only by the appended claims and equivalents thereof.

What is claimed is:

1. In a system providing a video graphic presentation having an input memory for receiving data from a first processor for each frame of the presentation and means responsive to said data for displaying a plurality of objects on a display having a plurality of horizontal scan lines, the data for each frame identifying the objects to be displayed and the locations of the objects on the display, a display processor for controlling the transfer of the data from the input memory to the display means to allow the first processor to operate independently of the display control comprising:

timing means responsive to said display means for initializing the display processor immediately prior to the display of a frame;

a macro-sequencer means for storing a plurality of macro-instructions, said macro-sequencer means reading out a first macro-instruction stored therein in response to initialization by the timing means; and a micro-sequencer means for storing a plurality of micro-instructions addressable by the macro-instructions read out by the macro-sequencer means, a series of said micro-instructions being executed in response to each macro-instruction received from the macro-sequencer means and including:

means responsive to said first macro-instruction and the display means for determining whether an object stored in the input memory is to be displayed on the next horizontal scan line; and means for addressing the macro-sequencer means to read out a second macro-instruction if the object is to be displayed on the next scan line, said micro-sequencer means being responsive to the second macro-instruction to transfer data from the input memory to the display means.

2. The system of claim 1 wherein the display includes a vertical blanking period between the display of successive frames and the first processor transfers data to the input register only during that period.

3. The system of claim 2 wherein said timing means is enabled near the end of the vertical blanking period.

4. The system of claim 1 wherein the macro-sequencer instructions are user programmable.

5. The system of claim 1 wherein the micro-sequencer instructions are user programmable.

6. The system of claim 1 further including a plurality of output channels coupled to the micro-sequencer means, the micro-sequencer means outputting data on each of said channels simultaneously.

7. The system of claim 1 wherein said timing means provides clock signals having a shorter period than the cycle time of said first processor.

8. In a system providing a video graphic presentation having an input memory for receiving data from a first processor for each frame of the presentation and means responsive to said data for displaying a plurality of objects on a display having a plurality of horizontal scan lines, the data for each frame identifying the objects to be displayed and the location of the objects on the display, a display processor for controlling the transfer of the data from the input memory to the display means to allow the first processor to operate independently of the display control comprising:
- timing means responsive to said display means for initializing the display processor immediately prior to the display of a frame; and
- a logic unit responsive to the display means and data from the input memory for determining whether an object is to be displayed on the next horizontal scan line;
- a macro-sequencer means for storing a plurality of macro-instructions, said macro-sequencer means reading out a first macro-instruction stored therein in response to initialization by the timing means; and
- a micro-sequencer means for storing a plurality of micro-instructions addressable by the macro-instructions read out from the macro-sequencer means, said micro-instructions including a first micro-instruction output to the input memory to cause the input memory to read out the location data for a first object ot the logic means, a second micro-instruction output to the logic means to cause the logic means to determine whether the first object is to be displayed on the next scan line, and a third micro-instruction output to the macro-sequencer in response to a determination that the first object is to be displayed on the next scan line to cause the macro-sequencer to read out a second the second macro-instruction to transfer data from the input memory to the display means.

* * * * *

UNITED STATES PATENT AND TRADEMARK OFFICE
CERTIFICATE OF CORRECTION

PATENT NO. : 4,597,043

DATED : June 24, 1986

INVENTOR(S) : John J. Pasierb, Jr.

It is certified that error appears in the above-identified patent and that said Letters Patent is hereby corrected as shown below:

Column 17, line 57, change "heXadecimal" to --hexadecimal--. Column 18, line 30, change "neXt" to --next--. Column 21, line 29, change "ADRESS" to --ADDRESS--; line 47, change "$R_{B011}$" to --$R_{B010}$--; line 53, delete the duplicate of the preceding line stating "040 24 3A 89". Column 24, line 7, Claim 8, change "ot" to --to--; line 14, Claim 8, after "second" insert --macro-instruction, said micro-sequencer being responsive to--.

Signed and Sealed this

Twenty-fifth Day of November, 1986

Attest:

DONALD J. QUIGG

Attesting Officer

Commissioner of Patents and Trademarks